US008681048B2

(12) United States Patent
Nishida

(10) Patent No.: US 8,681,048 B2
(45) Date of Patent: Mar. 25, 2014

(54) ARRIVAL ANGLE ESTIMATION SYSTEM, COMMUNICATION DEVICE, AND COMMUNICATION SYSTEM

(75) Inventor: Yoshifumi Nishida, Kanagawa (JP)

(73) Assignee: Sony Corporation, Tokyo (JP)

(*) Notice: Subject to any disclaimer, the term of this patent is extended or adjusted under 35 U.S.C. 154(b) by 340 days.

(21) Appl. No.: 12/127,992

(22) Filed: May 28, 2008

(65) Prior Publication Data

US 2008/0297401 A1 Dec. 4, 2008

(30) Foreign Application Priority Data

May 29, 2007 (JP) ................. P2007-141820

(51) Int. Cl.
*G01S 1/08* (2006.01)
*G01S 3/72* (2006.01)

(52) U.S. Cl.
USPC ............................ 342/386; 342/367; 342/432

(58) Field of Classification Search
USPC ......... 342/386, 410–413, 432, 433, 367, 414, 342/415
See application file for complete search history.

(56) References Cited

U.S. PATENT DOCUMENTS

| 4,053,892 | A | * | 10/1977 | Earp ............................ 342/398 |
| 4,742,356 | A | | 5/1988 | Kuipers |
| 4,780,722 | A | * | 10/1988 | Cusdin ......................... 342/437 |
| 5,009,501 | A | * | 4/1991 | Fenner et al. ............... 356/141.3 |
| 5,157,408 | A | * | 10/1992 | Wagner et al. ............... 342/399 |
| 5,541,608 | A | * | 7/1996 | Murphy et al. .............. 342/442 |
| 5,608,411 | A | * | 3/1997 | Rose ............................ 342/417 |
| 5,859,612 | A | * | 1/1999 | Gilhousen ................... 342/457 |
| 6,016,990 | A | | 1/2000 | Small |
| 6,061,022 | A | * | 5/2000 | Menegozzi et al. .......... 342/442 |
| 6,195,556 | B1 | * | 2/2001 | Reudink et al. ............ 455/456.2 |
| 6,608,592 | B2 | * | 8/2003 | McReynolds ................ 342/418 |
| 7,053,829 | B2 | * | 5/2006 | Krause et al. ................ 342/398 |
| 7,265,716 | B2 | * | 9/2007 | Ninomiya et al. ........... 342/442 |
| 7,280,073 | B2 | * | 10/2007 | Sayers ......................... 342/432 |
| 7,307,595 | B2 | * | 12/2007 | Schantz et al. .............. 343/718 |
| 7,313,403 | B2 | * | 12/2007 | Gong et al. ................ 455/456.1 |
| 2003/0162568 | A1 | | 8/2003 | Schreiner et al. |
| 2005/0032531 | A1 | | 2/2005 | Gong et al. |
| 2005/0085197 | A1 | | 4/2005 | Laroia et al. |
| 2006/0071853 | A1 | | 4/2006 | Sayers |
| 2007/0040687 | A1 | | 2/2007 | Reynolds |
| 2008/0316103 | A1 | * | 12/2008 | Rofougaran et al. ........ 342/386 |
| 2009/0121938 | A1 | * | 5/2009 | Wood et al. ................. 342/386 |

FOREIGN PATENT DOCUMENTS

| JP | 11-248811 | 9/1999 |
| JP | 2003-152621 | 5/2003 |
| JP | 2005-65010 | 3/2005 |
| JP | 2005-156521 | 6/2005 |

* cited by examiner

*Primary Examiner* — Cassie Galt
(74) *Attorney, Agent, or Firm* — Finnegan, Henderson, Farabow, Garrett & Dunner, L.L.P.

(57) ABSTRACT

An arrival angle estimation system includes a transmitting device and a receiving device and estimates an arrival angle at which frames transmitted by radio from the transmitting device arrive at the receiving device. The transmitting device includes two directional antennas each arranged so that its directivity is tilted at ±θ degrees with respect to the front of the transmitting device. The receiving device includes a directional antenna having directivity toward the front of the receiving device. Frames are transmitted alternately from the respective directional antennas of the transmitting device, and received signal strengths of the frames on the receiving device side for the respective transmitting directional antennas are compared with each other to estimate the arrival angle.

7 Claims, 14 Drawing Sheets

ARRIVAL ANGLE ESTIMATION SYSTEM, COMMUNICATION DEVICE, AND COMMUNICATION SYSTEM

CROSS REFERENCES TO RELATED APPLICATIONS

The present invention contains subject matter related to Japanese Patent Application JP 2007-141820 filed in the Japanese Patent Office on May 29, 2007, the entire contents of which are incorporated herein by reference.

BACKGROUND OF THE INVENTION

1. Field of the Invention

The present invention relates to an arrival angle estimation system for estimating the angle of arrival of radio waves, a communication device, and a communication system, and particularly to an arrival angle estimation system, a communication device, and a communication system which are used in a wireless communication device incorporating a wireless LAN such as IEEE802.11.

More specifically, the present invention relates to an arrival angle estimation system, a communication device, and a communication system which are used within a short distance range under the condition of sufficient line of sight and are simple, compact, and low cost, in particular, an arrival angle estimation system, a communication device, and a communication system which are used in a wireless communication device equipped with a plurality of antennas.

2. Description of the Related Art

Wireless networks are attracting attention as systems for freeing users from wires in wired communication methods of the related art. Typical examples of such wireless networks are wireless LAN (Local Area Network) specifications such as IEEE (The Institute of Electrical and Electronics Engineers) 802.11a/b, g. Wireless LANs enable flexible internet connections, making it possible to not only replace existing wired LANs but also to provide internet connection means even in public places such as hotels, airport lounges, stations, and cafes.

In many wireless communications, data is transmitted under a multi-path environment in which an overlap of a direct wave and a plurality of reflected waves/delay waves arrives at the receiving device, so delay distortion due to multi-path reception may occur, causing an error in communication. Accordingly, standard wireless LAN specifications such as IEEE802.11a/b, g adopt an OFDM modulation scheme, which is one of multi-carrier schemes. In the OFDM modulation scheme, transmit data is distributed across a plurality of carriers having frequencies orthogonal to each other and then transmitted, so the band of each carrier becomes narrow, thus providing very high efficiency of frequency utilization and robustness against frequency-selective fading.

While wireless LANs have already achieved widespread use, in recent years, it is becoming increasingly common to incorporate wireless LAN functionality also into compact and lightweight CE (Consumer Electronics) apparatuses such as digital cameras, music players, and mobile telephones. Many wireless communication schemes enable flexible connections by use of a non-directional antenna. In contrast, in the case of a wireless LAN incorporated into a mobile apparatus, the size of the antenna must be small. Also, in this case, applications using a directional antenna, such as connecting to a specific communication party who has waved a mobile apparatus over the directional antenna, are conceivable. These applications require a technique for detecting or estimating the angle of arrival of radio waves.

Numerous studies have been done on the techniques for detecting the arrival angle of radio waves, representative examples of which include a method based on the spatial spectrum using the OFDM technique, MUSIC (Multiple Signal Classification) algorithm, and ESPRIT (Estimation of Signal Parameters via Rotational Invariance Technique) algorithm. According to the MUSIC method, by using an array antenna, the eigenvalue and eigenvector of a correlation matrix obtained from an array antenna reception signal are found to calculate an angular spectrum. Although the ESPRIT method also involves finding the eigenvalue and eigenvector of a correlation matrix obtained from an array antenna reception signal as in the MUSIC method, the ESPRIT method differs from the MUSIC method in that the angle of arrival of radio waves is estimated on the basis of the rotational invariance between sub array antennas. Further, an electronically steerable parasitic array radiator antenna (ESPAR antenna) developed by the ATR (Advanced Telecommunications Research Institute International) produces a directional beam with antenna elements arranged in a circle through mutual element coupling, thereby making it possible to steer the angle of arrival of radio waves.

Each of the above-mentioned signal arrival direction estimation techniques provide a high arrival angle estimation accuracy even under multi-path environments, allowing for estimation with an accuracy of ±3 to 5 degrees even in the presence of an obstacle. However, these techniques are designed for measurement between, for example, buildings that are several tens of meters apart. As such, these techniques require an antenna with a special mechanism, such as an array antenna with high dimensionality and large size, and systems using these techniques are expensive due to the complex computations involved, making their incorporation into compact apparatuses difficult.

In the case of a compact apparatus incorporating a wireless LAN, an arrival angle estimation system that is simple, compact, and low cost is desired. The assumed distance between the system serving as the transmitter of radio waves and the system that performs arrival angle estimation is about 2 meters. Since the influence of multi-path need not be taken into account so much in a good line of sight condition, generally, an accuracy of 30 to 40 degrees suffices.

If the distance between two systems is sufficiently short, even when some obstacle is present between the two systems, a human can perform an operation for securing a line of sight by using visual perception to avoid the obstacle. For example, in a case where one of the system serving as the transmitter of radio waves and the system that performs arrival angle estimation is a device that is mobile, if there is an obstacle between the two systems, the user of that system may simply take such actions as moving to a position free from the influence of the obstacle while carrying the mobile device, removing the obstacle, or recognizing that arrival angle estimation does not function and thus not performing an estimating operation.

For example, there has been proposed a signal arrival direction estimation device in which two effective area antennas are each formed as a rigid wave guide horn, the device includes a hybrid circuit for outputting sum and differential signals of a pair of antenna output signals inputted from the two effective area antennas, and the antennas are rotated by 360 degrees about a rotational axis positioned on a line that is perpendicular to a plane including the maximum radiation direction of the two effective area antennas and passes through a point bisecting the electrical centers of the two effective area antennas (see, for example, Japanese Unexamined Patent Application Publication No. 2005-156521). According to the proposed device, the sum and differential signals are measured by separate wideband receivers, the resulting data is integrated in the time domain or the frequency domain to find the total received power for each of angles, and once two patterns with respect to the ultra-wideband signal are obtained, the direction in which the maximum and minimum values of these two patterns match can be estimated as being the signal arrival direction.

However, it is difficult to incorporate a rotary mechanism that rotationally drives antennas into a compact mobile apparatus, and the presence of such a movable part causes problems in terms of fault tolerance and maintenance. Further, such a signal arrival direction estimation method can be applied only to the receiving side.

SUMMARY OF THE INVENTION

It is desirable to provide a superior arrival angle estimation system, communication device, and communication system that are suitable for use in a wireless communication device incorporating a wireless LAN such as IEEE802.11.

It is also desirable to provide a superior arrival angle estimation system, communication device, and communication system which are used within a relatively short distance and under conditions in which a sufficient line of sight can be provided, and are configured to be simple, compact, and low cost.

According to a first aspect (corresponding to an embodiment) of the present invention, there is provided an arrival angle estimation system including a transmitting device and a receiving device, the arrival angle estimation system estimating an arrival angle at which frames transmitted by radio from the transmitting device arrive at the receiving device, in which: the transmitting device includes two directional antennas each arranged so that its directivity is tilted at $\pm\theta$ degrees with respect to the front of the transmitting device; the receiving device includes a directional antenna having directivity toward the front of the receiving device; and frames are transmitted alternately from the respective directional antennas of the transmitting device, and received signal strengths of the frames on the receiving device side for the respective transmitting directional antennas are compared with each other to estimate the arrival angle.

It should be noted that the term "system" as used in this specification refers to a logical assembly of a plurality of devices, and is not limited to one in which respective devices are located within the same housing (the same applies hereinafter).

In recent years, it is becoming increasingly common to incorporate wireless LAN functionality into compact mobile apparatuses. In this regard, considering applications such as connection to a specific communication party who has waved a mobile apparatus over an antenna, a technique for detecting or estimating the angle of arrival of radio waves becomes necessary.

Although high-accuracy signal arrival direction estimation techniques such as the MUSIC algorithm or ESPRIT algorithm already exist, these techniques require an antenna with a special mechanism, and systems using these techniques are expensive due to the complex computations involved, making their incorporation into compact apparatuses difficult.

In contrast, the arrival angle estimation system according to an embodiment of the present invention includes a transmitting device having two directional antennas each arranged so that its directivity is tilted at $\pm\theta$ degrees with respect to the front, and a receiving device having a directional antenna having directivity toward the front.

Most of radio apparatuses including wireless LAN cards are equipped with two or more antenna elements, and a transmitting device and a receiving device for diversity operation. By making use of this arrangement, there is no particular cost increase involved in constructing a communication device including two directional antennas.

With the application of the arrival angle estimation system to mainly compact apparatuses such as mobile telephones in mind, an accuracy of 30 to 40 degrees suffices. Therefore, it is suitable to use a compact directional antenna with a half-power angle of about 40 to 120 degrees. For example, an inexpensive and compact microstrip antenna whose length of one side is about 2 cm may be used.

The two directional antennas included in the transmitting device are each arranged so that its directivity is tilted at $\pm\theta$ degrees with respect to the front of the transmitting device. For example, two transmitting antennas that exhibit strong directivity when at an angle of 0 degree relative to the receiving side may be mounted with their directional orientations tilted at $\pm\theta$ degrees. Alternatively, two directional antennas that exhibit strong directivity when tilted at an angle of $\pm\theta$ degrees relative to the receiving side may be mounted in parallel.

Then, in the arrival angle estimation system according to an embodiment of the present invention, frames are transmitted alternately from the respective directional antennas of the transmitting device, and received signal strengths of the frames on the receiving device side for the respective transmitting directional antennas are compared with each other to estimate the arrival angle.

Specifically, frames are transmitted from the transmitting device while switching the antennas used for transmission alternately at short intervals. On the other hand, upon reading information embedded in the received frames, the receiving device finds the mean of the signal strengths of received frames for each of the antennas used for the transmission. The difference between the two mean values of received signal strengths vary in accordance with the difference in the relative angle between the transmitting device and the receiving device.

Accordingly, while varying the angle between the transmitting device and the receiving device, the difference $\Delta S$ between the signal strengths of frames received from the respective transmitting antennas is measured, and the relationship between the difference $\Delta S$ and the angle between the transmitting device and the receiving device is stored in advance. Then, while the transmitting device and the receiving device communicate with each other, the difference $\Delta S$ is simultaneously measured from the signal strengths for the respective transmitting antennas, and by referencing previously measured data, the angle between the transmitting device and the receiving device can be estimated from the current value of $\Delta S$.

Factors affecting the difference $\Delta S$ in received signal strength from respective transmitting antennas are the transmitting antenna gain, the receiving antenna gain, and the propagation loss, with respect to the transmit signal power for each transmitting antenna. Here, assuming that the transmission powers from the respective transmitting antennas are the same, and that the propagation losses between the respective transmitting antennas and the receiving antenna are also the same, then the difference $\Delta S$ in received signal strength from respective transmitting antennas can be regarded as being the difference in gain between the respective transmitting antennas. Therefore, it can be understood that $\Delta S$ is determined by the transmission gains of the two directional antennas and does not depend on the gain of the receiving device and the propagation loss. Therefore, the receiving device used for measurement in advance, and the receiving device to be actually used for angle detection may not be the same. Also, the distance between the receiving device and the transmitting device does not affect ΔS, either.

It should be noted that the terms "transmitting device" and "receiving device" as used herein do not mean the transmitting and receiving sides of a data frame, but mean the transmitting and receiving sides of a frame used for arrival angle estimation. Thus, depending on the communication sequence, the receiving side of a data frame (for example, a communication apparatus that returns an acknowledgement frame in response to a data frame), not the transmitting side, may become the "transmitting device".

In a scheme in which the transmitting device takes an initiative in transferring frames used for arrival angle estimation, for example, a communication device equipped with directional antennas transfer data frames while switching the antennas used for transmission, and the signal strengths of the transferred data frames are measured on the receiving device side. If there is no transmit data to be transferred in the upper layer on the receiving device side, data frames whose data size is 0 are generated and transmitted. When transferring data frames, the directional antennas used for transmission are switched at a fixed cycle so that the frames can be received on the receiving device side with substantially the same frequency from the two transmitting antennas.

On the other hand, in a scheme in which the receiving device takes an initiative in transferring frames used for arrival angle estimation, the receiving device that estimates the arrival angle transmits data frames at fixed intervals, and measures the signal strengths of acknowledgement frames returned from the transmitting device equipped with the two directional antennas in response to the transmitted data frames. If there is no data to be transferred in the upper layer on the receiving device side, data frames whose size is 0 are generated and transmitted.

Since IEEE802.11 specifies that an acknowledgement frame (ACK/NACK) be always returned from the receiving side upon receiving a transferred data frame, when data frames are transmitted at fixed intervals, acknowledgement frames can be received similarly at substantially fixed intervals. Therefore, by taking advantage of such a communication procedure, the receiving device can estimate the arrival angle on the basis of the receiving signal strengths of the acknowledgement frames transmitted for the respective transmitting antennas.

According to a second aspect of the present invention, there is provided an arrival angle estimation system including a transmitting device and a receiving device, the arrival angle estimation system estimating an arrival angle at which frames transmitted by radio from the transmitting device arrive at the receiving device, in which: the transmitting device includes a directional antenna having directivity toward the front of the transmitting device; the receiving device includes two directional antennas each arranged so that its directivity is tilted at ±θ degrees with respect to the front of the receiving device; and frames transmitted from the transmitting device are received by using the directional antennas alternately, and received signal strengths of the frames at the respective receiving directional antennas are compared with each other to estimate the arrival angle.

In a case where directional antennas are used on the receiving device as described above, unlike the system in which two directional antennas each arranged so that its directivity is tilted at ±θ degrees are equipped on the transmitting device side, no special processing such as storing information related to a transmitting antenna into each transmitted frame is required on the transmitting device side.

In the arrival angle estimation system according to the second aspect as well, either one of the transmitting device and the receiving device can take an initiative in transferring frames used for arrival angle estimation.

In the former case, the transmitting device transfers data frames, and the signal strengths of the data frames are measured on the receiving device side while alternately switching the receiving antennas. If there is no transmit data to be transferred in the upper layer on the transmitting device side, data frames whose data size is 0 are generated and transmitted. Further, the receiving device switches the directional antennas used for reception alternately at a fixed cycle so that the frames can be received from the two antennas with substantially the same frequency.

In the latter case, the receiving device that estimates the arrival angle transmits data frames at fixed intervals by using either one of the directional antennas, and the receiving device receives acknowledgement frames, which are returned from the transmitting device in response to the data frames, while switching the receiving antennas alternately, and measures the signal strengths of the acknowledgement frames. If there is no data to be transferred in the upper layer on the receiving device side, data frames whose data size is 0 are generated and transmitted.

According to a third aspect of the present invention, there is provided an arrival angle estimation system including a transmitting device and a receiving device, the arrival angle estimation system estimating an arrival angle at which frames transmitted by radio from the transmitting device arrive at the receiving device, in which: the transmitting device includes two directional antennas each arranged so that its directivity is tilted at ±θ degrees with respect to the front of the transmitting device; the receiving device includes two directional antennas each arranged so that its directivity is tilted at ±θ degrees with respect to the front of the receiving device; and frames transmitted from the transmitting device are received by using the directional antennas alternately, and received signal strengths of the frames at the respective receiving directional antennas are compared with each other to estimate the arrival angle.

In the arrival angle estimation system according to the third aspect of the present invention, while varying the angle between the transmitting device and the receiving device, the transmitting device transmits frames to the receiving device while alternately switching the transmitting antennas. In response to this, the received signal strengths from the respective transmitting antennas when the frames are received by the receiving device while switching the receiving antennas are measured for the respective receiving antennas, and the difference ΔS in received signal strength is calculated. Then, the relationship between the difference ΔS for each transmitting antenna with respect to the respective receiving antennas and the angle between the transmitting device and the receiving device is stored in advance.

Thereafter, when the transmitting device communicates with the receiving device while alternately switching the transmitting antennas, simultaneously, the received signal strengths at the respective receiving antennas when the receiving device receives the frames from the transmitting device while alternately switching the receiving antennas are measured. Then, once the current value of the difference ΔS in received signal strength between the transmitting antennas is found for each receiving antenna, this is compared against previously stored data, thereby making it possible to estimate the angle between the transmitting device and the receiving device.

In this way, the receiving device can obtain the relationship between ΔS and the angle between the transmitting device and the receiving device for each receiving antenna from the frames alternately transmitted from two transmitting antennas, and can also obtain two sets of determination results on the relative angle between the transmitting and receiving devices. A more robust arrival angle estimation can be performed on the basis of these two sets of determination results.

In the arrival angle estimation system according to the third aspect as well, as in the system according to the first and second aspects, either one of the transmitting device and the receiving device can take an initiative in transferring frames used for arrival angle estimation.

According to a fourth aspect of the present invention, there is provided a communication system including: a transmitting device including two directional antennas having vertical polarization that are attached to the front so that polarization directions of the directional antennas are tilted at substantially 90 degrees with respect to each other; and a receiving device including a directional antenna having directivity toward the front, in which frames are transmitted alternately from the respective directional antennas of the transmitting device, and received signal strengths of the frames on the receiving device side for the respective transmitting directional antennas are compared with each other to estimate a tilt of the transmitting device with respect to a horizontal direction.

With the communication system according to the fourth aspect of the present invention, the tilt of the transmitting device with respect to the horizontal direction can be estimated by means of a simple, compact, and inexpensive structure.

Specifically, the transmitting device transmits frames to the receiving device by alternately switching the transmitting directional antennas while varying a tilt of the transmitting device with respect to the horizontal direction, and the receiving device measures received signal strengths of the frames received from the respective transmitting directional antennas to obtain a difference ΔP between the transmitting directional antennas. Then, a relationship between the difference ΔP and an angle between the transmitting device and the receiving device is stored in advance.

Thereafter, the transmitting device communicates with the receiving device while alternately switching the transmitting directional antennas and, simultaneously, the receiving measures received signal strengths of frames received from the respective transmitting directional antennas of the transmitting device to obtain a difference ΔP in received signal strength between the transmitting directional antennas, and the difference ΔP currently obtained is compared against previously measured data to estimate a tilt of the transmitting device with respect to the horizontal direction.

As each transmitting antenna, the transmitting device can use a microstrip antenna having a plurality of feeding points. In this case, by switching the feeding points in the respective antennas, the combination of polarizations of the two directional antennas can be changed. Then, the tilt and relative angle of a communication apparatus are measured on the basis of the results of signal processing, and antenna information from the antenna switching mechanism and the feeding point switching mechanism. By employing the system configured as described above, two functions, that is, detection of the relative angle between the receiving device and the transmitting device, and detection of the tilt of the transmitting device, can be performed by a pair of antennas alone.

According to an embodiment of the present invention, it is possible to provide a superior arrival angle estimation system, communication device, and communication system which are used within a relatively short distance and under conditions in which a sufficient line of sight can be provided, and are configured to be simple, compact, and low cost.

In the arrival angle estimation system according to an embodiment of the present invention, at least one of the transmitting device and the receiving device includes two directional antennas each arranged so that its directivity is tilted at ±θ degrees with respect to the front, frames are transmitted or received while switching the antennas, and the arrival angle can be estimated on the receiving side on the basis of the difference in received signal strength between the transmitting devices or receiving devices.

Considering the fact that most of radio apparatuses including wireless LAN cards are equipped with two or more antenna elements, and a transmitting device and a receiving device for diversity operation, there is no particular cost increase involved in constructing a communication device including two directional antennas, thus making it possible to make the system simple, compact, and inexpensive. Further, with application to mainly compact apparatuses such as mobile telephones in mind, a sufficient level of accuracy of about 30 to 40 degrees can be attained.

The present invention assumes that the wireless communication apparatus uses a technique based on IEEE802.11, and arrival angle estimation can be performed in a satisfactory manner in both of the networking modes of the ad-hoc mode and the infrastructure mode. Further, a sufficient estimation accuracy on the order of ±30 degrees can be accomplished by a combination of an existing radio technology such as IEEE802.11 and simple directional antennas.

Other objects, features, and advantages of the present invention will become apparent from the following detailed description of embodiments of the present invention and the accompanying drawings.

DESCRIPTION OF THE PREFERRED EMBODIMENTS

An embodiment of the present invention will be described in detail with reference to the drawings.

A. Configuration Of Antenna

An arrival angle estimation system according to an embodiment of the present invention assumes use of a wireless communication device equipped with a plurality of antennas as a precondition. At present, most of wireless communication devices are equipped with a plurality of antennas for diversity operation, so most of wireless communication devices that are commonly available satisfy this precondition.

Mainly assumed as an application of the arrival angle estimation system according to an embodiment of the present invention is its application to compact apparatuses such as mobile telephones, so generally an accuracy of 30 to 40 degrees suffices. Therefore, it is suitable to use a compact directional antenna with a half-power angle of about 40 to 120 degrees. For example, an inexpensive and compact microstrip antenna whose length of one side is about 2 cm may be used.

Figure 1:
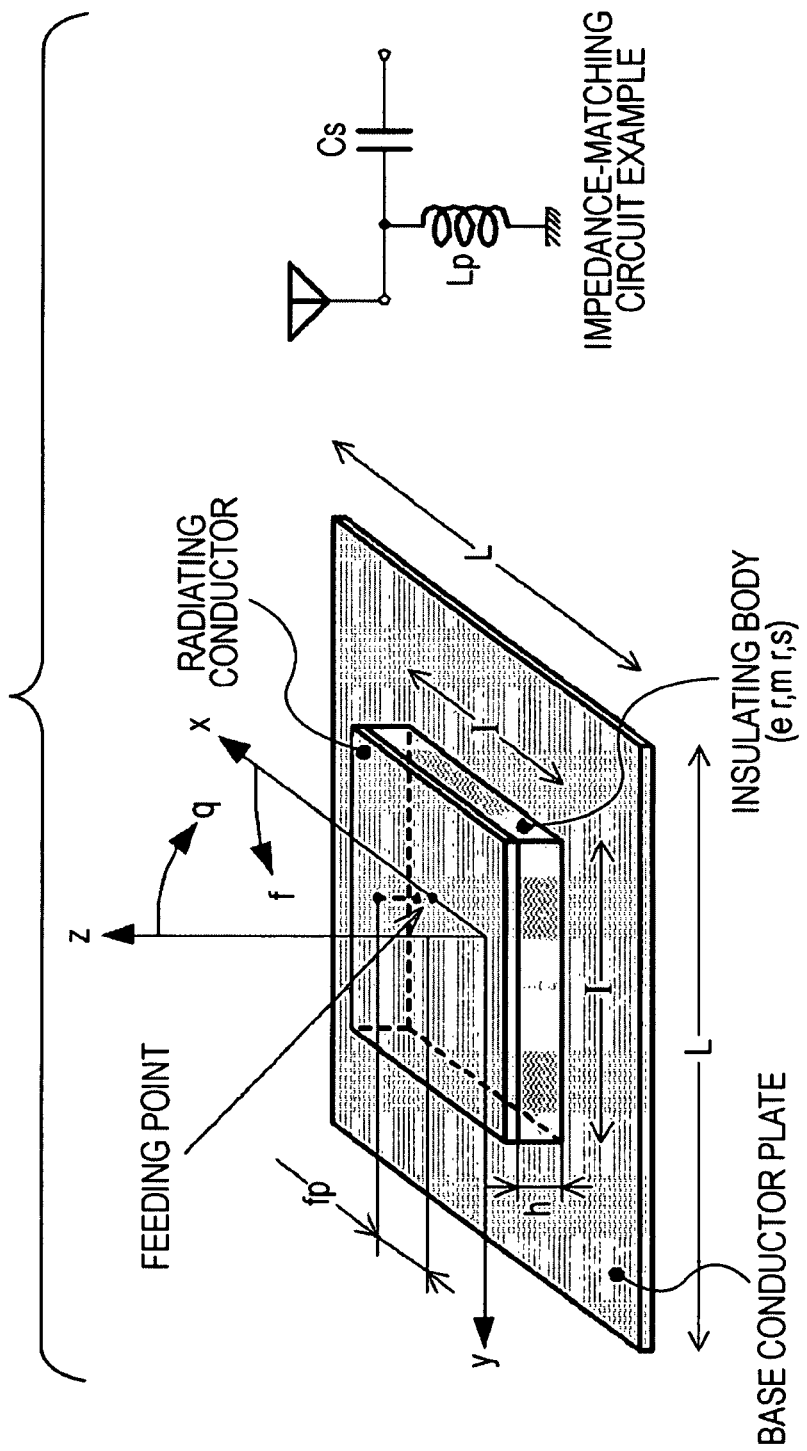
FIG. 1 is a diagram showing an example of the configuration of a microstrip antenna and its impedance-matching circuit.

FIG. 1 shows an example of the configuration of a microstrip antenna and its impedance-matching circuit. The microstrip antenna includes a radiating conductor and a conductor base plate that are opposed to each other with an insulating material therebetween. Although not particularly specified, a rectangular or circular shape is mostly used as the shape of the radiating conductor. In the illustrated example, a radiating conductor plate of a rectangular shape is used. A dielectric is used as the insulating body, and its thickness is generally equal to or less than $\frac{1}{10}$ of the wavelength λ of a radio frequency. Hence, the insulating material is thin.

At the actual manufacture, a microstrip antenna is often produced by etching a double copper-clad dielectric substrate, thus allowing for easy manufacture or easy integration with a circuit board. The radiation directivity in the case of excitation at the lowest-order mode (in the case of a rectangle, $TM_{10}$-mode) generally indicates uni-directionality in the z-axis direction, and a directional gain on the order of several dBis can be obtained. Further, in order to allow excitation, the feeding point is provided at a position slightly offset from the center. Matching to 50 ohms can be accomplished by adjusting this offset length. The polarization direction of the antenna can be determined by the offset direction of the feeding point.

The arrival angle estimation system according to an embodiment of the present invention can be applied to any communication apparatus that serves as the transmitting-side or receiving-side communication apparatus to perform communication, as far as the system satisfies the above-described conditions of being equipped with two or more antennas, and having a directivity with a half-power angle of about 40 to 120 degrees (description in this regard will be given later)

Figure 2:
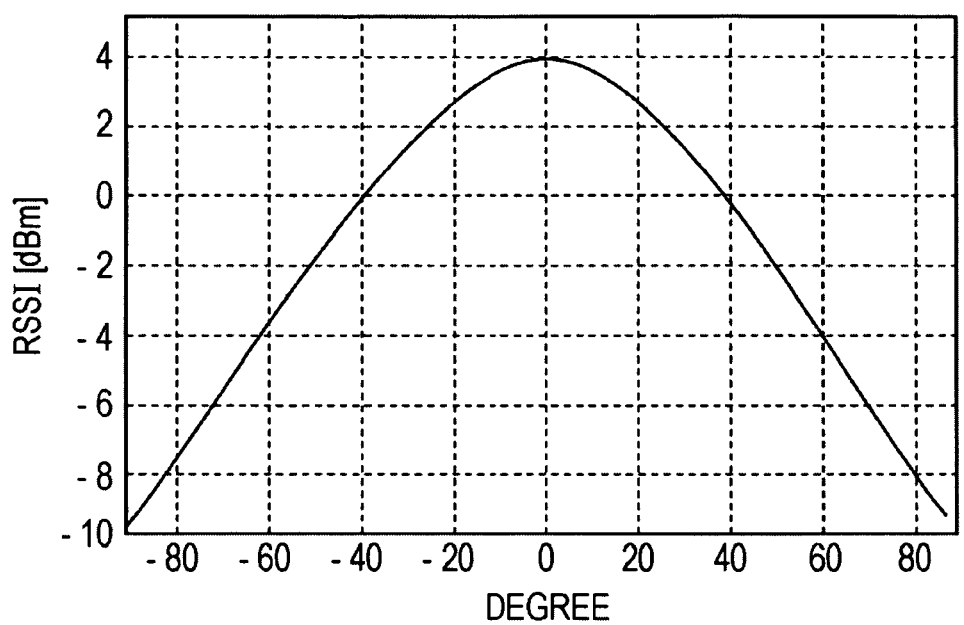
FIG. 2 is a diagram showing typical directivity of a directional antenna with a half-power angle of 60 degrees.

FIG. 2 shows the typical directivity of a directional antenna with a half-power angle of 60 degrees. In the drawing, the X axis represents the relative angle between a transmitting antenna and a receiving device, and the Y axis represents RSSI (Receiving Signal Strength Indicator) of a frame at the receiving device.

Figure 3:
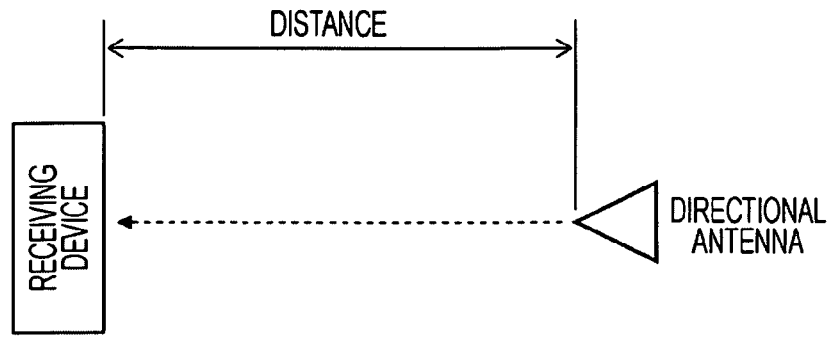
FIG. 3 is a diagram showing an example of the configuration of a directional antenna and receiving device.
Figure 4:
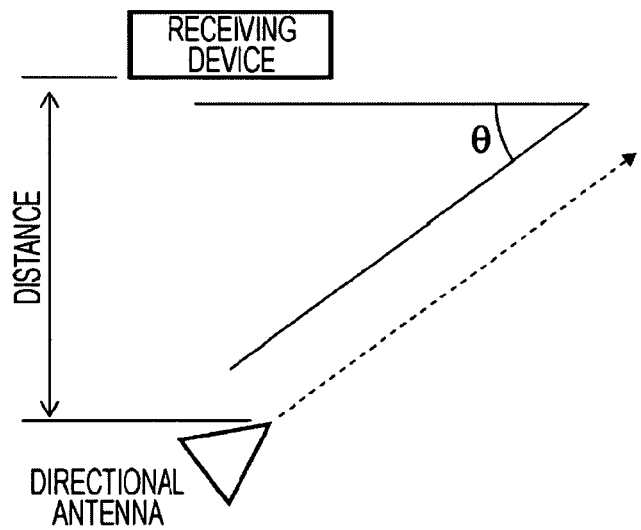
FIG. 4 is a diagram showing an example of the configuration of a directional antenna and receiving device.

A conceivable arrival angle estimation method may be such that a radio frame transmitted from the directional antenna of the transmitting device is received by the receiving device, and the received signal strength of the frame is measured to thereby determine the angle of the directional antenna. Implementing this method presents some difficulties in the case of a using single directional antenna. FIG. 3 shows a system configuration example in which the directional antenna faces opposite the receiving device but are spaced apart from each other by a somewhat large distance, and FIG. 4 shows a system configuration example in which the distance between the directional antenna and the receiving device is small but the directional antenna does not face opposite the receiving device. While the signal strength measured on the receiving side may take the same value in these two situations, it may be difficult to determine which one of the two situations is the current situation from the signal strength alone.

The present invention takes advantage of the fact that most of radio apparatuses including wireless LAN cards are equipped with two or more antenna elements and transmitting and receiving devices for diversity operation.

In the case of normal diversity operation, each radio apparatus is equipped with two antenna elements and two frame transmitting and receiving devices, and a plurality of receiving devices are operated simultaneously and radio frames are received by all of the devices. By employing this method, even in situations where the received signal strength at one receiving device temporarily drops and the reliability of data thus deteriorates, communication can be continued in a stable manner if the signal strength at another receiving device is sufficient.

In contrast, according to the present invention, transmitting and receiving devices are each equipped with a directional antenna having the directivity as shown in FIG. 2. On the side of a transmitting device 10, two planar antennas are mounted at a tilt as shown in FIG. 5 so that the directivities of the antennas are at an angle to each other, and arranged so as to face the receiving device 20.

Figure 6:
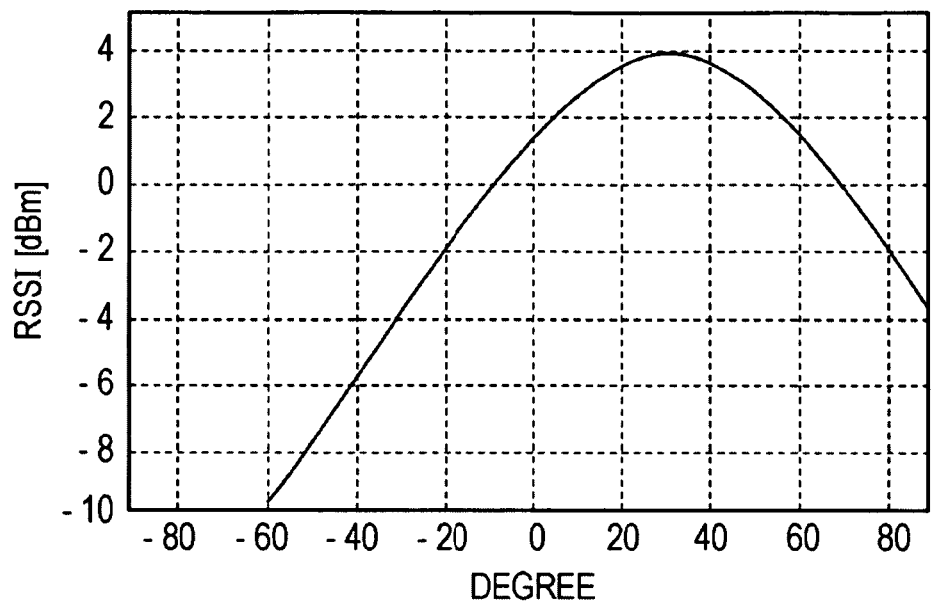
FIG. 6 is a diagram illustrating deflected directivity.

Alternatively, directional antennas having deflected directivity as shown in FIG. 6 may be arranged in parallel (for example, planar antennas whose directivities are tilted with respect to each other are arranged on the same plane).

Figure 5:
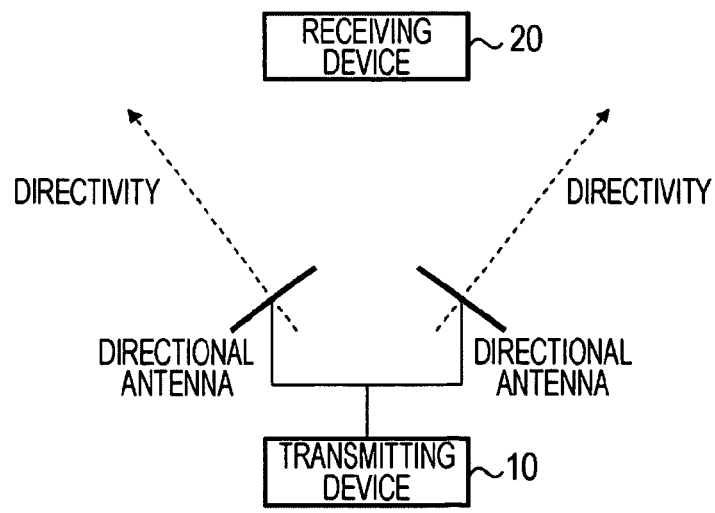
FIG. 5 is a diagram showing an example of the configuration of a system including two directional antennas.
Figure 7:
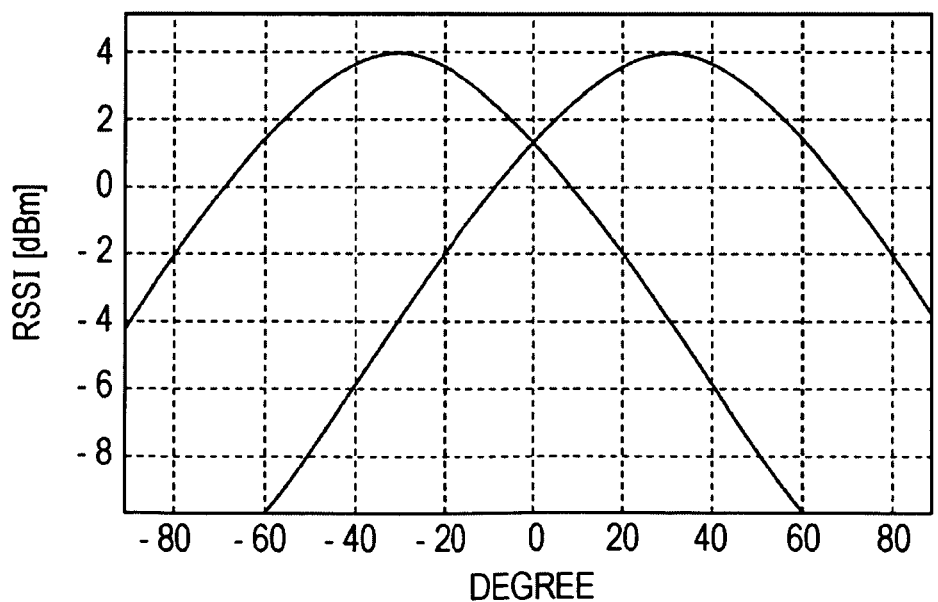
FIG. 7 is a diagram showing the directivities of a transmitting device including two directional antennas whose directivities are deflected from each other.

In either of the system shown in FIG. 5 in which two directional antennas are arranged at a tilt, and the system using directional antennas with the directivity shown in FIG. 6, the directivities of two directional antennas are as shown in FIG. 7. Although FIG. 7 does not take interference between the two antenna elements into account, in actuality, the directivity of the respective antennas are slightly deflected toward the center due to mutual coupling between the antennas which occurs when bringing the two antenna elements into proximity with each other. For this reason, it is preferable to measure the directivity of the transmitting device with the two directional antennas placed in position as a whole, rather than measuring the directivity of each antenna individually.

B. Method of Measuring Signal Strength

As described above, the arrival angle estimation system according to an embodiment of the present invention includes the transmitting device 10 including two directional antennas each arranged so that its directivity is tilted at ±θ degrees (for example, θ=30 degrees) with respect to the front side, and the receiving device 20 including a directional antenna having directivity toward the front side.

The transmitting device 10 transmits frames while alternately switching the antennas used for transmission at short intervals. At that time, information indicating from which antenna a frame has been transmitted is added to each transmitted frame.

Upon reading information embedded in a received frame, the receiving device 20 determines from which one of the antennas on the transmitting device 10 side the received frame has been transmitted (however, the specific technique for determining the antenna from which a frame has been transmitted will be described later). Then, the mean of the signal strengths of received frames is found for each of the antennas used for the transmission. At this time, the mean of the received signal strengths of the frames transmitted from an antenna 1 is Sig1, the mean of the received signal strengths of the frames transmitted from an antenna 2 is Sig2, and the difference $\Delta S$ between the two mean signal strengths is found by $\Delta S=Sig1-Sig2$. The difference $\Delta S$ varies in accordance with the difference in the relative angle between the transmitting device 10 and the receiving device 20 to which the directional antennas are mounted.

Accordingly, the difference $\Delta S$ between the signal strengths of frames received from the respective antennas is measured while varying the angle between the transmitting device 10 and the receiving device 20, and the relationship between the difference $\Delta S$ and the angle between the transmitting device 10 and the receiving device 20 is stored in advance. Thereafter, when the transmitting device 10 and the receiving device 20 perform communication with each other, $\Delta S$ is measured from the signal strength simultaneously, and previously measured data is referenced, thereby making it possible to estimate the angle between the transmitting device 10 and the receiving device 20 from the current value of $\Delta S$.

It should be noted that the terms "transmitting device" and "receiving device" as used herein do not mean the transmitting and receiving sides of a data frame, but mean the transmitting and receiving sides of a frame used for arrival angle estimation. Thus, depending on the communication sequence, the receiving side of a data frame, not the transmitting side, may become the "transmitting device".

Figure 8:
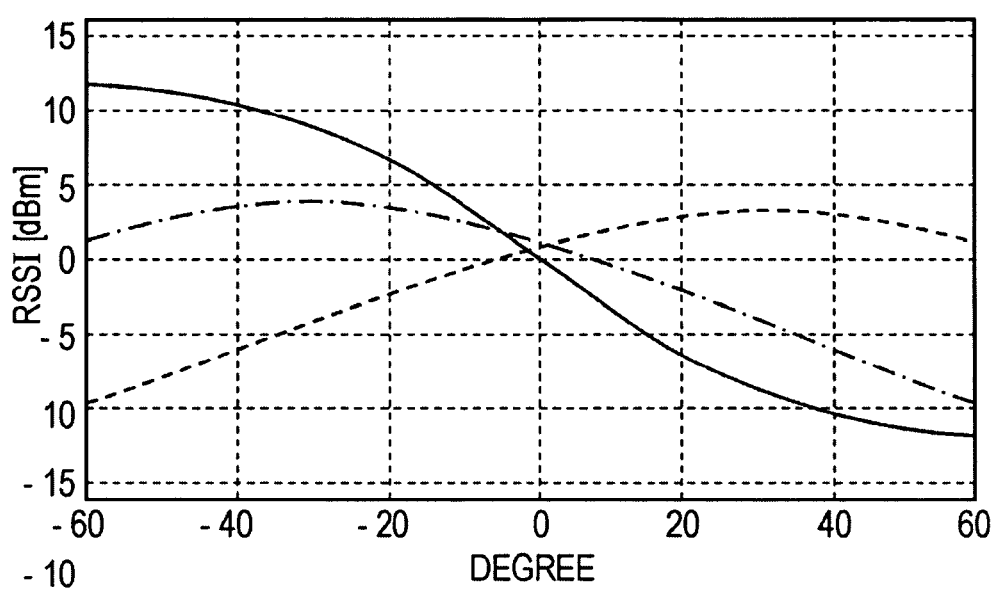
FIG. 8 is a diagram showing the mean values of signal strengths when frames are received by a receiving device from respective directional antennas of a transmitting device including two directional antennas whose directivities are deflected from each other, and the relationship between the difference between the two mean values of signal strengths and the arrival angle between the transmitting device and the receiving device.

In FIG. 8, the relationship between the difference $\Delta S$ in received signal strength between antennas used for transmission, and the angle between the transmitting device 10 and the receiving device 20 is indicated by a solid line. It should be noted that two directional antennas having the directivity as shown in FIG. 1 are each arranged at an angle of ±30 degrees with respect to the front of the transmitting device 10 as shown in FIG. 5. Also, it is assumed that the antenna of the receiving device 20 has directivity toward the front. In FIG. 8, Sig1 representing the received signal strength of a frame transmitted from the antenna 1, and Sig2 representing the received signal strength of a frame transmitted from the antenna 2 are indicated by a broken line and an alternate long and short dash line, respectively.

In FIG. 8, the X axis represents the relative angle between each directional antenna on the transmitting device 10 side and the receiving device 20, and the Y axis represents the signal strength. It can be seen from the drawing that when the relative angle between the transmitting device 10 and the receiving device 20 is 0 degree, that is, when the front side of the transmitting device 10 faces opposite the front side of the receiving device 20, the difference $\Delta S$ between the signal strengths of frames received from the antenna 1 and the antenna 2 is 0. Then, as the difference in angle between the front direction of the transmitting device 10 and the front direction of the receiving device 20 that face each other becomes larger, $\Delta S$ gradually increases or decreases.

The arrival angle estimation system according to an embodiment of the present invention is configured as shown in FIG. 5 or 6. The arrival angle at which frames transmitted from the transmitting device 10 arrive at the receiving device 20 is estimated on the basis of the relationship between the difference $\Delta S$ between the signal strengths of frames received from the respective transmitting antennas, and the angle between the transmitting device 10 and the receiving device 20. First, $\Delta S$ is measured while varying the angle between the transmitting device 10 and the receiving device 20, and the resulting data is recorded in advance in the angle arrival estimation system. Then, while the transmitting device 10 and the receiving device 20 perform communication, $\Delta S$ is measured from the signal strength simultaneously, and the previously measured data is referenced, thereby estimating the angle between the transmitting device 10 and the receiving device 20 from the current value of ΔS.

Now, assuming that the received signal strength at the receiving device 20 is $P_r$ [dBm], $P_r$ can be represented by Equation (1) below.

[Equation 1]

$$P_r = P_t - \Gamma + G_t + G_r \qquad (1)$$

In Equation (1) above, $P_t$ [dBm] represents the transmission power of radio waves at the transmitting device 10, $G_t$ [dBi] represents the gain of a transmitting antenna, and $G_r$ [dBi] represents the gain of a receiving antenna. Γ represents the propagation loss of radio waves in a free space. Here, let the gain, transmission power, and propagation loss of the directional antenna 1 installed on the transmitting device 10 be $G1_t$, $P1_t$, and Γ1, respectively, and further, let the gain, transmission power, and propagation loss of the directional antenna 2 be $G2_t$, $P2_t$, and Γ2, respectively. If the received signal strengths when the receiving device 20 receives radio waves transmitted by using the directional antennas 1 alone and the directional antenna 2 alone are $P1_r$ [dBi] and $P2_r$ [dBm], respectively, the received signal strengths $P1_r$ and $P2_r$ can be represented by Equations (2) and (3) below.

[Equation 2]

$$P1_r = P1_t - \Gamma 1 + G1_t + G_r \qquad (2)$$

$$P2_r = P2_t - \Gamma 2 + G2_t + G_r \qquad (3)$$

When the same electric power is applied to the two directional antennas on the transmitting device 10 side, the transmission powers $P1_t$ and $P2_t$ from the respective transmitting antennas 1 and 2 are the same value. The propagation losses Γ1 and Γ2 are each a value that varies depending on such factors as the distance between the two transmitting antennas and the receiving device 20 or conditions regarding the presence/absence of an obstacle or reflecting object therebetween. The present invention assumes as a precondition that the distance between the two directional antennas on the transmitting device 10 side is about 3 to 20 cm, and the distance between the transmitting antenna and the receiving antenna is 3 m or less. Therefore, it can be assumed that the distance or conditions regarding the presence/absence of an obstacle or reflecting object between the two transmitting antenna and the receiving antenna is substantially the same, and hence the respective propagation losses Γ1 and Γ2 can be also regarded as being the same value. Consequently, the difference $P1_r - P2_r$ between the received powers at the receiving device 20 of radio waves transmitted from the two directional antennas on the transmitting device 10 side can be represented by Equation (4) below.

[Equation 3]

$$P1_r - P2r = G1_t - G2_t \qquad (4)$$

This value of $P1_r - P2_r$ corresponds to ΔS described above. It can be appreciated from Equation (4) above that ΔS is determined by the transmission gains of the two directional antennas and does not depend on the gain of the receiving device 20 and the propagation loss. Therefore, the receiving device 20 used for measurement in advance, and the receiving device 20 to be actually used for angle detection may not be the same. Also, the distance between the receiving device 20 and the transmitting device 10 does not affect ΔS, either.

Needless to say, the above-described model is based on an ideal condition, and in actuality, it is frequently the case that Γ1 and Γ2 are not the same. However, it is possible to attain a level of accuracy sufficient for determinations that require a relatively low accuracy, such as a determination as to whether the transmitting device 10 "substantially faces opposite", "faces to the left of", or "faces to the right of" the receiving device 20.

Figure 12:
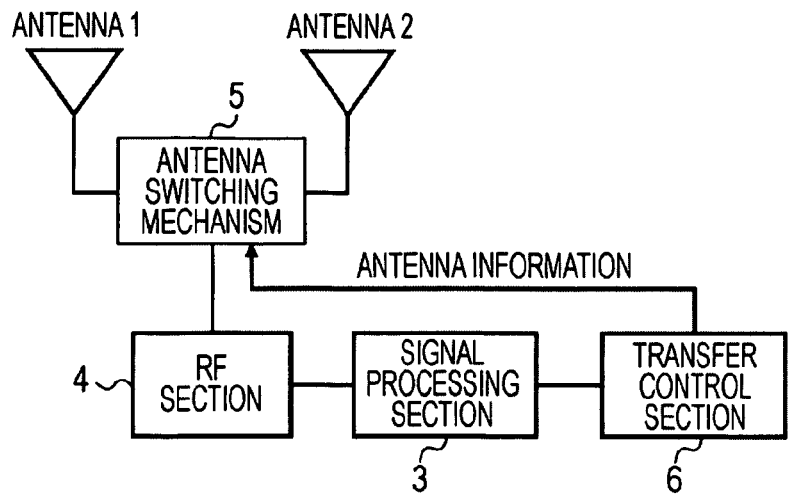
FIG. 12 is a diagram schematically showing the configuration of a transmitting device.

FIG. 12 schematically shows the configuration of the transmitting device 10. The transmitting device 10 includes the two directional antennas 1 and 2 each arranged so that its directivity is deflected from each other. In the following, the two directional antennas of the transmitting device 10 will be respectively referred to as the "antenna 1" and "antenna 2". A signal processing section 3 applies predetermined processing such as baseband processing to transmission data supplied from an upper layer of the communication protocol. An RF section 4 converts a transmitted baseband signal into an analog signal, and upconverts the signal into an RF signal. An antenna switching mechanism 5 transmits frames while switching the antennas used for transmission alternately at short fixed intervals, in accordance with an instruction from a transfer control section 6. At that time, information for determining from which antenna a frame has been transmitted is added to each transmitted frame.

Figure 10:
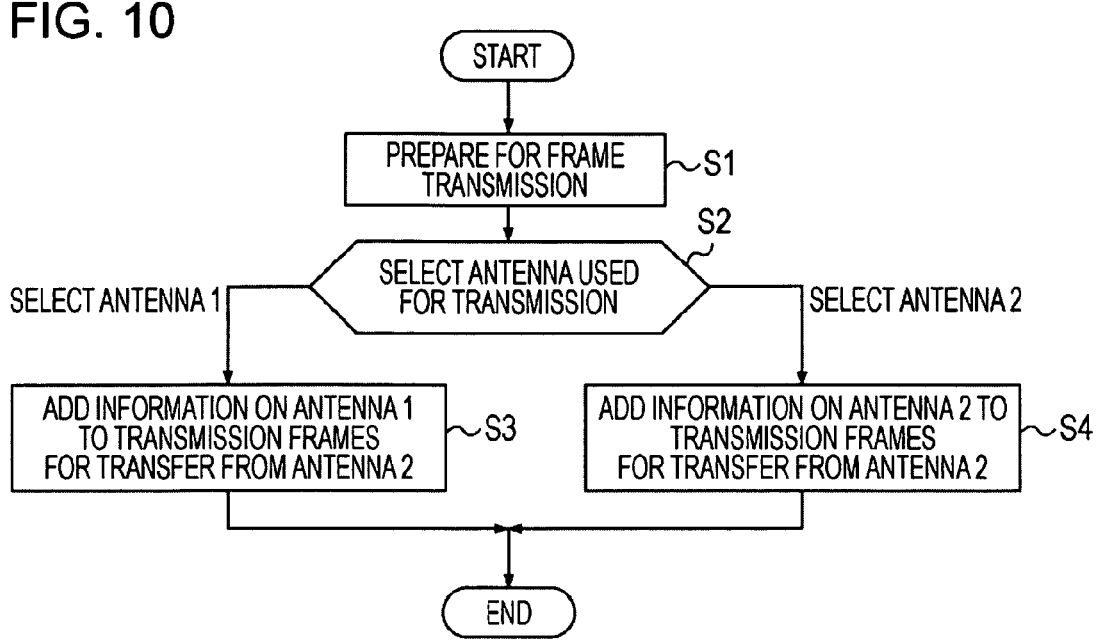
FIG. 10 is a flowchart showing the procedures of processing executed by a transmitting device when performing arrival angle estimation.

FIG. 10 is a flowchart showing the procedures of processing executed by the transmitting device 10 when performing arrival angle estimation.

First, preparations for frame transmission are made by the signal processing section and the RF section (step S1). Then, the transfer control section alternately switches the antennas used for transmission at short fixed intervals (step S2).

When the antenna 1 is selected as the antenna for transmitting frames, information on the antenna 1 is added to the frames, and RF transmit signals are transferred to the antenna 1 via the antenna switching mechanism (step S3). When the antenna 2 is selected as the antenna for transmitting frames, information on the antenna 2 is added to the frames, and RF transmit signals are transferred to the antenna 2 via the antenna switching mechanism (step S4).

Figure 11:
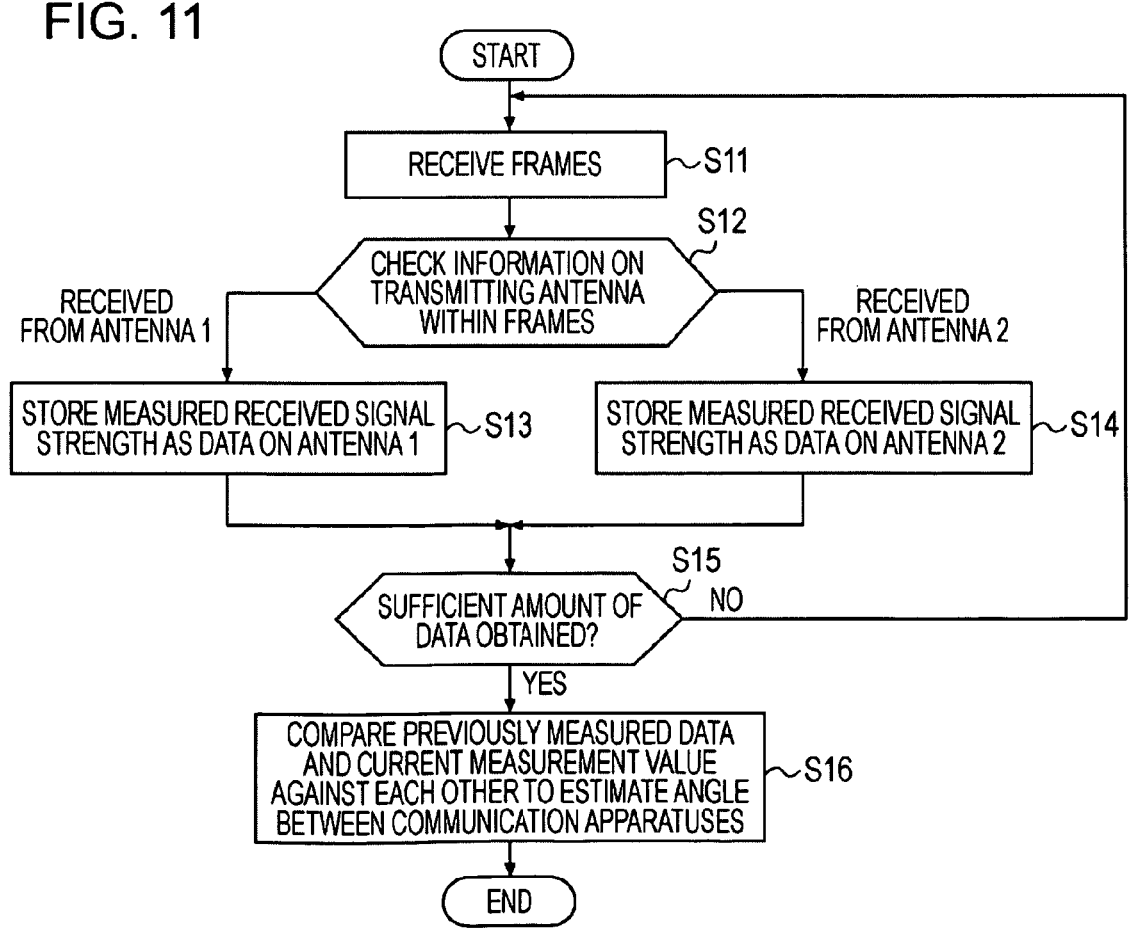
FIG. 11 is a flowchart showing the procedures of processing executed by a receiving device when performing arrival angle estimation.

FIG. 11 is a flowchart showing the procedures of processing executed by the receiving device 20 when performing arrival angle estimation.

Upon receiving a frame from the transmitting device (step S31), the receiving device reads information embedded in the frame to determine from which one of the antennas on the transmitting device side the frame has been transmitted (step S12), and also measures the signal strength of the received frame.

If it is determined that the received frame has been transmitted from the antenna 1, the measured received signal strength is stored as data on the antenna 1 (step S13), and if it is determined that the received frame has been transmitted from the antenna 2, the received signal strength is stored as data on the antenna 2 (step S14).

Then, if a sufficient amount of data has been obtained (Yes in step S15), the difference ΔS between Sig1 as the mean of the received signal strengths of frames transmitted from the antenna 1, and Sig2 as the mean of the received signal strengths of frames transmitted from the antenna 2 is found, and by referencing previously measured data, the angle between the transmitting device and the receiving device is estimated from the current value of ΔS (step S16).

C. Method of Determining Transmission Antenna

On the receiving device side, it is necessary to determine from which one of the antennas on the transmitting device side a received frame has been transmitted. Hereinbelow, a method of determining a transmitting antenna will be described.

The present invention assumes that the wireless communication apparatus uses techniques based on IEEE802.11 (802.11a, 802.11b, 802.11g).

Figure 9:
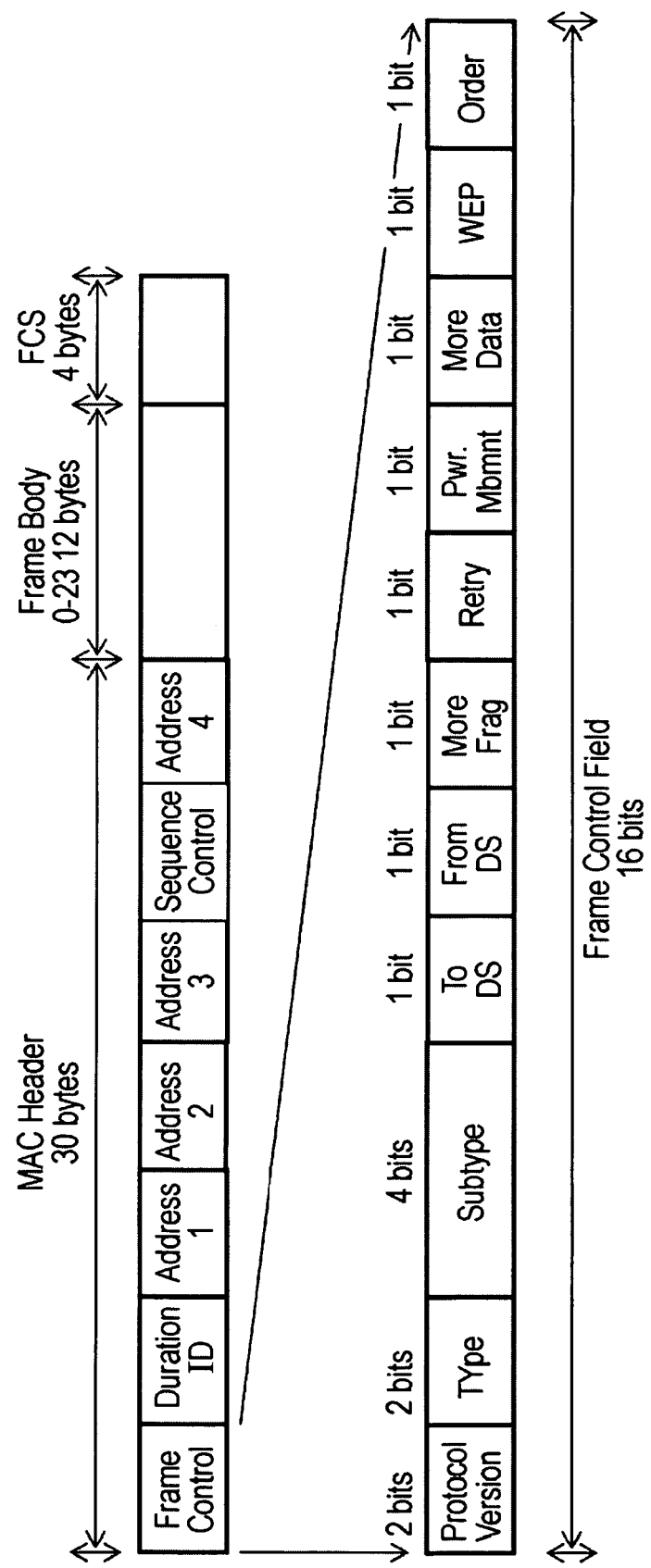
FIG. 9 is a diagram showing the frame format according to IEEE802.11.

FIG. 9 shows a frame format based on IEEE802.11. Frames based on IEEE802.11 includes MAC (Machine Access Control) header having a size of 30 bytes, Frame Body having a size of 0 to 2312 bytes, and FCS (Frame Check Sequence) having a size of 4 bytes. The first 2 bytes (16 bits) of the MAC header of 30 bytes is called Frame Control in which frame control information is stored. The 16 bits of the Frame Control field have the structure as shown in the lower part of FIG. 9. Of these, two bits corresponding to a Type field, and four bits corresponding to a Subtype field are used to specify the frame kind. For example, when the value of the Type field is 1, this indicates that the frame in question is a frame including control information, and when the value of the Subtype field is 13 (1101 in binary), this indicates that the frame in question is one of control frames which includes acknowledgement information.

In the communication system shown in FIG. 5, the transmitting device 10 adds information related to a transmitting antenna to each of two kinds of frame, a data frame and an acknowledgement frame, in order to identify the antenna from which each frame has been transmitted. In the case of a data frame, the value of the Type field becomes 2. At this time, the Subtype field is used for indicating the data frame kind, and takes a value of 0 to 3 (information to be stored differs slightly according to the value of Subtype) to indicate that the frame in question is a frame that stores data. A value of the Subtype field equal to or larger than 8 (1000 in binary) is not defined at the present time. This undefined value of the Subtype field can be used for transmitting information related to a transmitting antenna. That is, a value of the Subtype field from 8 to 11 (1000 to 1011 in binary) indicates that this frame has been transmitted from the antenna 1, and a value of the Subtype field from 12 to 15 (1100 to 1111 in binary) indicates that this frame has been transmitted from the antenna 2.

Since an acknowledgement frame is a kind of control frame, the Type field takes a value of 1. The value of Subtype used for an acknowledgement frame is only 13 (1101 in binary). Of Subtype in a control frame, values from 0 to 9 (0000 to 1001 in binary) are undefined. Information for identifying a transmitting antenna can be transmitted by using this portion. That is, if the value of the Subtype field is 5 (0101 in binary), this indicates that a frame has been transmitted by using the antenna 1, and if the value of the Subtype field is 6 (0110 in binary), this indicates that a frame has been transmitted by using the antenna 2.

D. Frame Transfer Scheme

In the arrival angle estimation system according to an embodiment of the present invention, frames sent from a communication device equipped with directional antennas are observed by a receiving device to estimate the relative angle between the communication device equipped with the directional antennas and the receiving device. Accordingly, it is necessary to transfer frames used for estimation of the arrival angle (that is, measurement of the received signal strength) regularly from the antennas on the transmitting device side to the receiving device.

It should be noted that the terms "transmitting device" and "receiving device" as used herein do not mean the transmitting and receiving sides of a data frame, but mean the transmitting and receiving sides of a frame used for arrival angle estimation. In other words, an apparatus for which the arrival angle is to be measured is the "transmitting device", and an apparatus that measures the arrival angle is the "receiving device". Depending on the communication sequence, the receiving side of a data frame, not the transmitting side, can become the "transmitting device". For example, with a mobile device serving as a "transmitting device", and a stationary communication apparatus such as a PC serving as a "receiving device", that is, a "sensing device", the angle of arrival from the mobile device waved by the user is estimated on the PC side.

Networking in IEEE802.11 is based on the concept of BSS (Basic Service Set). There are two kinds of BBB, a BSS defined by the "infrastructure mode" in which an access point (AP) exists, and an IBSS (Independent BSS) defined by the "ad-hoc mode" including a plurality of MTs (Mobile Terminal: mobile stations or device stations) only.

Figure 23A:
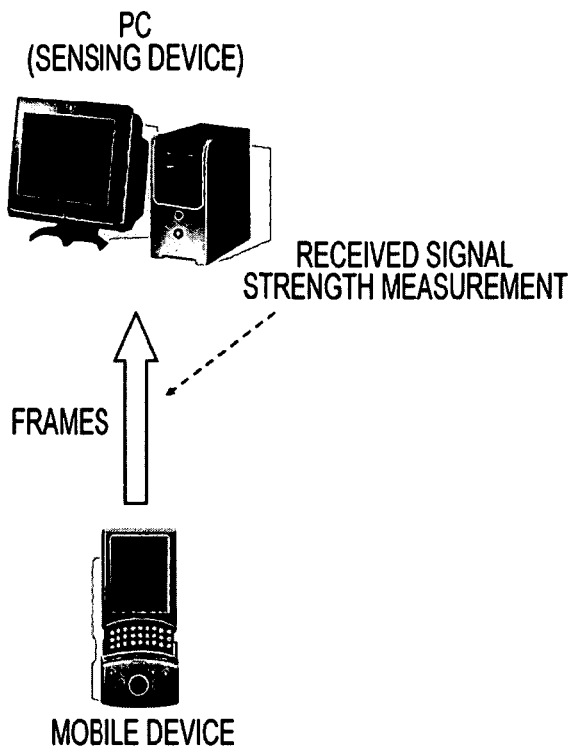
FIG. 23A is a diagram showing an example in which the present invention is applied to an ad-hoc mode in networking based on IEEE802.11.

FIG. 23A shows how the angle of arrival from a mobile device is estimated on the PC side in the ad-hoc mode. While the mobile device and the PC are directly communicating with each other under the ad-hoc mode, the PC can measure the arrival angle by measuring the received signal strengths of frames transmitted to the PC by the mobile device.

Figure 23B:
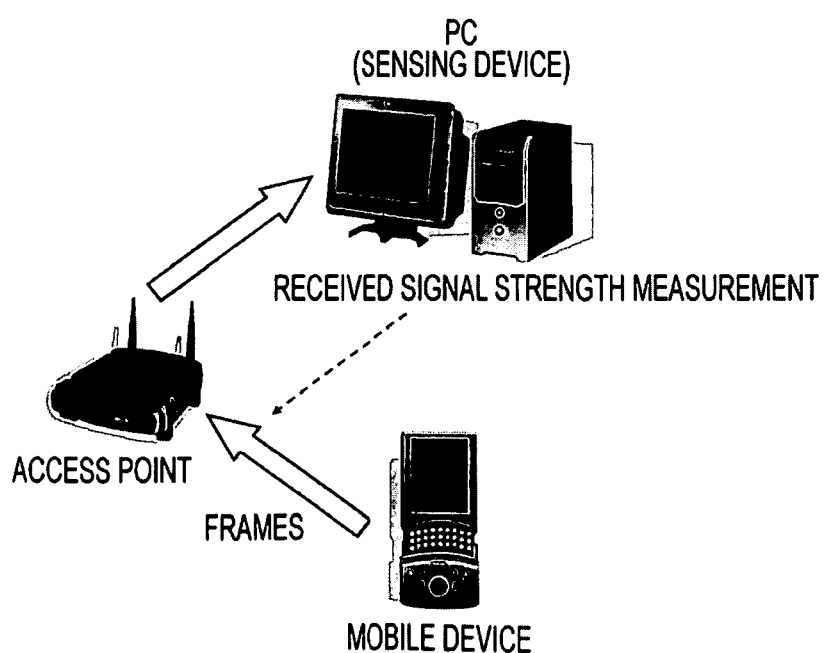
FIG. 23B is a diagram showing an example in which the present invention is applied to an infrastructure mode in networking based on IEEE802.11.
Figure 23C:
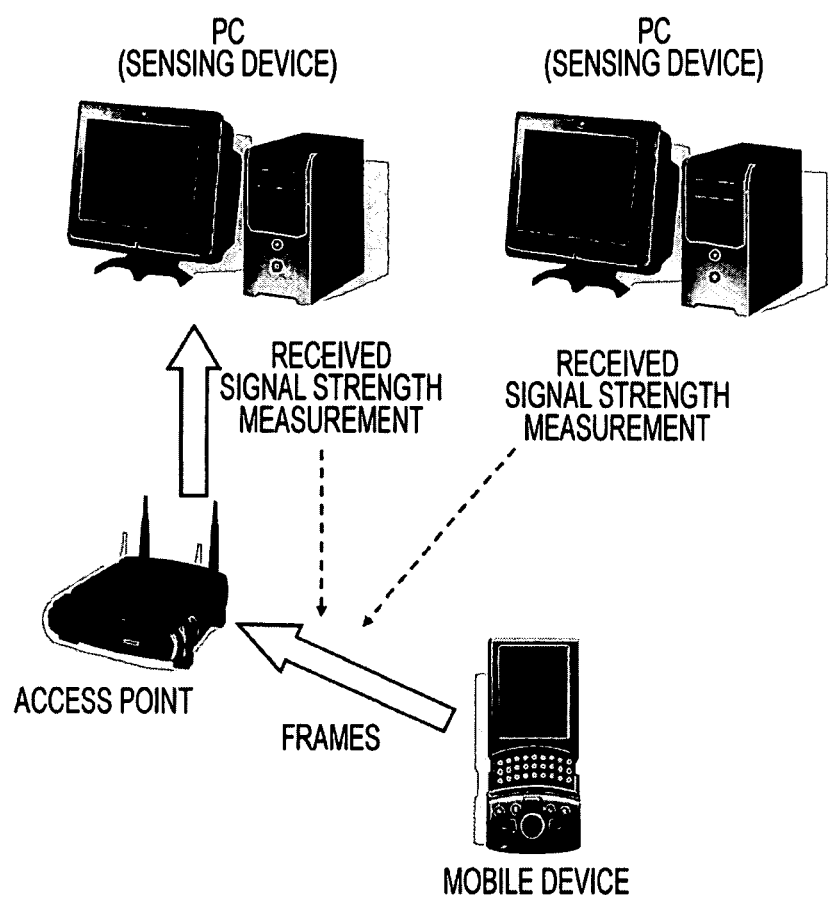
FIG. 23C is a diagram showing an example in which the present invention is applied to an infrastructure mode in networking based on IEEE802.11.

FIG. 23B shows how the angle of arrival from a mobile device is estimated on the PC side in the infrastructure mode. In the illustrated example, the mobile device and the PC communicate with each other via an access point, and the PC performs arrival angle estimation by measuring the received signal strengths of frames addressed to the access point from the mobile device. Further, in the example shown in FIG. 23C, while the mobile device and the PC are communicating with each other via an access point in the infrastructure mode, a PC that is not a communication party measures the received signal strengths of frames addressed to the access point by the mobile device to thereby estimate the arrival angle.

Two types of transfer scheme are conceivable as the frame transfer scheme to be used for estimation of the arrival angle (that is, measurement of the received signal strength), a transmitter-based frame transfer scheme and a receiver-based frame transfer scheme.

In the transmitter-based frame transfer scheme, the transmitting device 10 equipped with the directional antennas transfers data frames at fixed intervals, and the signal strengths of the transferred data frames are measured on the receiving device 20 side. If there is no transmit data to be transferred in the upper layer, data frames whose data size is 0 are generated and transmitted. When transferring data frames, the directional antennas used for transmission are switched at a fixed cycle so that the frames can be received on the receiving device 20 side with substantially the same frequency from the two transmitting antennas.

On the other hand, in the receiver-based frame transfer scheme, the receiving device 20 that estimates the arrival angle transmits data frames at fixed intervals, and measures the signal strengths of acknowledgement frames returned from the transmitting device 10 equipped with the two directional antennas in response to the transmitted data frames. If there is no data to be transferred in the upper layer, data frames whose size is 0 are generated and transmitted. IEEE802.11 specifies that an acknowledgement frame (ACK/NACK) be always returned from the receiving side upon receiving a transferred data frame. Accordingly, by taking advantage of such a specification developed by the IEEE802.11, the arrival angle can be estimated on the basis of the receiving signal strengths of the acknowledgement frames transmitted for respective transmitting antennas.

E. System Using Two Directional Antennas on Receiving Device

The foregoing description is directed to a system in which two directional antennas each arranged so that its directivity is tilted at ±θ degrees are equipped on the transmitting device 10 side. However, the two directional antennas may be similarly equipped not on the transmitting device 10 side but on the receiving device 20 side to determine the relative angle between the receiving device 20 and the transmitting device 10.

In the latter arrival angle estimation system, when receiving frames from the transmitting device 10, the receiving device 20 receives the frames while switching between the antenna 1 and the antenna 2 at fixed intervals, measures the means Sig1 and Sig2 of the received signal strengths of frames for the respective antennas, finds the difference ΔS=Sig1−Sig2 between the mean received signal strengths, and stores the results in advance as previously stored relationship between ΔS and the angle between the transmitting device 10 and the receiving device 20. Then, at the time of arrival angle estimation, the receiving device 20 receives frames from the transmitting device 10 while switching between the antenna 1 and the antenna 2 at fixed intervals, measures the difference ΔS between the received signal strengths at the respective antennas, and determines the relative angle between the transmitting device 10 and the receiving device 20 on the basis of the previously stored relationship between ΔS and the arrival angle.

The configuration of the receiving device 20 in this case is the same as that shown in FIG. 12, so detailed description thereof is omitted here.

Figure 13:
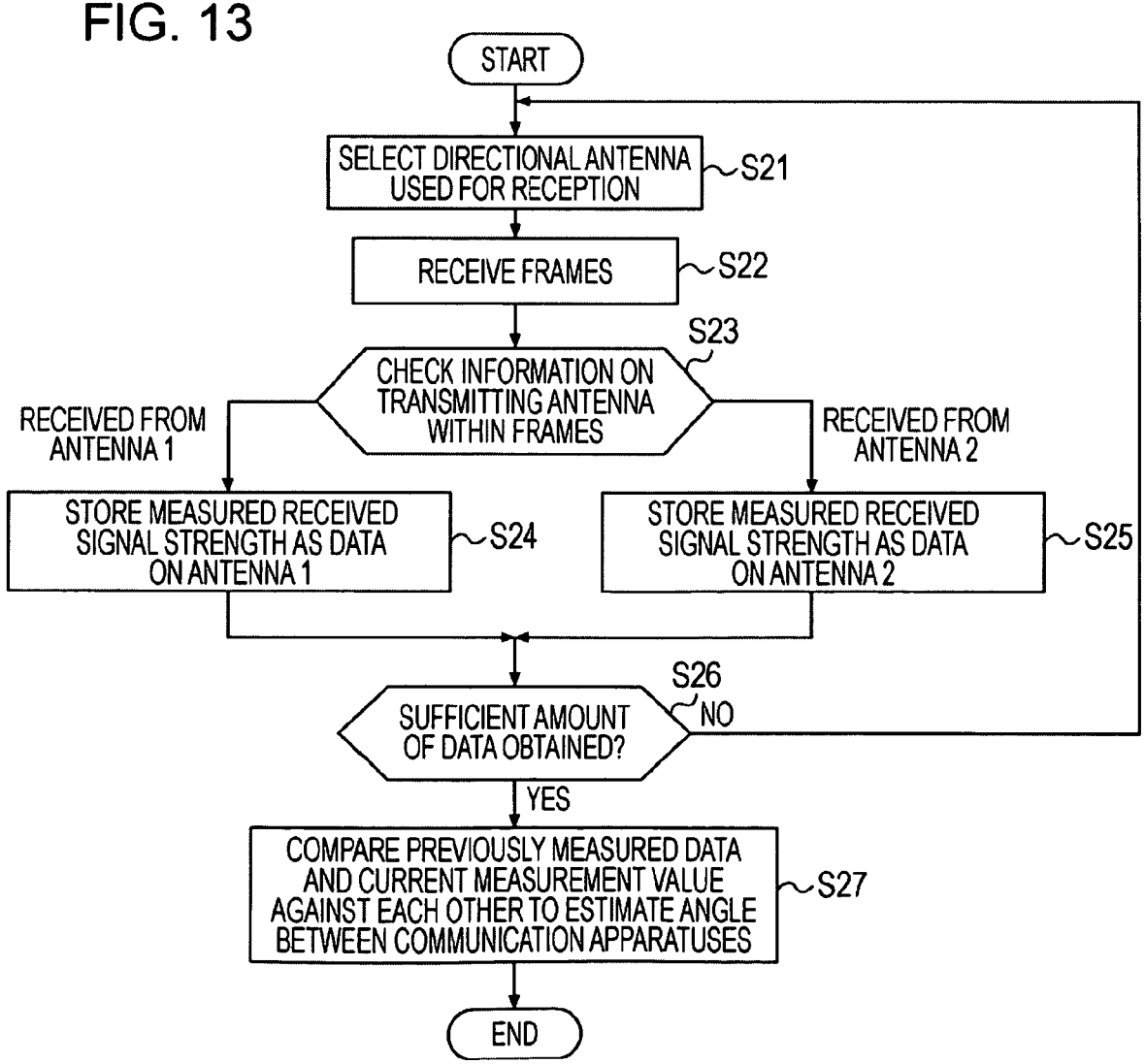
FIG. 13 is a flowchart showing the procedures of processing executed when arrival angle estimation is performed by a receiving device equipped with two directional antennas that are each arranged so that its directivity is tilted at ±θ degrees.

FIG. 13 is a flowchart showing the procedures of processing executed when arrival angle estimation is performed by the receiving device 20 equipped with two directional antennas that are each arranged so that its directivity is tilted at ±θ degrees.

The transfer control section 6 selects a directional antenna to be used for reception (step S21), and upon arrival of frames from the transmitting device (step S22), checks the receiving antenna (step S23).

When the antenna 1 is selected as the receiving antenna, an RF signal received by the antenna 1 via the antenna switching mechanism 5 is transferred to the RF section, followed by a decoding/demodulation process in the signal processing section 3. Further, the received signal strength measured at that time is stored as data on the antenna 1 (step S24). On the other hand, when the antenna 2 is selected as the receiving antenna, an RF signal received by the antenna 2 via the antenna switching mechanism 5 is transferred to the RF section, followed by a decoding/demodulation process in the signal processing section 3. Further, the received signal strength measured at that time is stored as data on the antenna 2 (step S25).

Then, if a sufficient amount of data has been obtained (Yes in step S26), the difference ΔS between the mean Sig1 of the received signal strengths of frames received by the antenna 1, and the mean Sig2 of the received signal strengths of frames received by the antenna 2 is found, and by referencing previously measured data, the angle between the transmitting device and the receiving device is estimated from the current value of ΔS (step S27).

In a case where directional antennas are used on the receiving device 20 as described above, unlike the system in which two directional antennas each arranged so that its directivity is tilted at ±θ degrees are equipped on the transmitting device 10 side, no special processing such as storing information related to a transmitting antenna into each transmitted frame is required on the transmitting device 10 side.

In the case of the arrival angle estimation system using directional antennas on the receiving device 20 side as well, either one of the transmitting device 10 and the receiving device 20 can take an initiative in transferring frames used for arrival angle estimation.

In the former case, the transmitting device 10 transfers data frames, and the signal strengths of the data frames are measured on the receiving device 20 side while alternately switching the receiving antennas. If there is no transmit data to be transferred in the upper layer on the transmitting device 10 side, data frames whose data size is 0 are generated and transmitted. Further, the receiving device 20 switches the directional antennas used for reception alternately at a fixed cycle so that the frames can be received from the two antennas with substantially the same frequency.

In the latter case, the receiving device 20 that estimates the arrival angle transmits data frames at fixed intervals by using either one of the directional antennas, and the receiving device 20 receives acknowledgement frames, which are returned from the transmitting device 10 in response to the data frames, while switching the receiving antennas alternately, and measures the signal strengths of the acknowledgement frames. If there is no data to be transferred in the upper layer on the receiving device 20 side, data frames whose data size is 0 are generated and transmitted.

F. System Using Two Directional Antennas on Both Transmitting and Receiving Devices The foregoing description is directed to a system in which two directional antennas each arranged so that its directivity is tilted at ±θ degrees are equipped on only one of the transmitting device 10 and the receiving device 20. However, the relative angle between the transmitting device 10 and the receiving device 20 can be determined also by equipping two directional antennas to both the transmitting device 10 and the receiving device 20.

In the system in which both the transmitting device 10 and the receiving device 20 use two directional antennas, the transmitting device 10 transmits frames while switching the antennas used for transmission at fixed intervals. At that time, information related to the transmitting antenna is added to each frame (same as above). On the other hand, when receiving frames from the transmitting device 10, the receiving device 20 receives the frames while switching between the antenna 1 and the antenna 2 at fixed intervals, measures the means Sig1 and Sig2 of the received signal strengths of frames for the respective receiving antennas, finds the difference ΔS=Sig1−Sig2 between the mean received signal strengths, and stores the results in advance as previously stored relationship between ΔS and the angle between the transmitting device 10 and the receiving device 20.

Then, at the time of arrival angle estimation, the transmitting device 10 transmits frames while switching the antennas used for transmission at fixed intervals. At that time, information related to the transmitting antenna is added to the frames (same as above). On the other hand, the receiving device 20 receives the frames from the transmitting device 10 while switching between the two receiving antennas at fixed intervals. At that time, the difference ΔS between the received signal strengths of frames transmitted from the respective transmitting antennas is measured for each receiving antenna, and the relative angle between the transmitting device 10 and the receiving device 20 is determined on the basis of the previously stored relationship between ΔS and the arrival angle.

Therefore, according to this system, the receiving device 20 can obtain the relationship between ΔS and the angle between the transmitting device 10 and the receiving device 20 for each receiving antenna from the frames alternately transmitted from two transmitting antennas, and can also obtain two sets of arrival angle determination results. A more robust arrival angle estimation can be performed on the basis of these two sets of determination results.

The configuration of each of the transmitting device 10 and receiving device 20 in this case is the same as that shown in FIG. 12, so detailed description thereof is omitted here.

Figure 14:
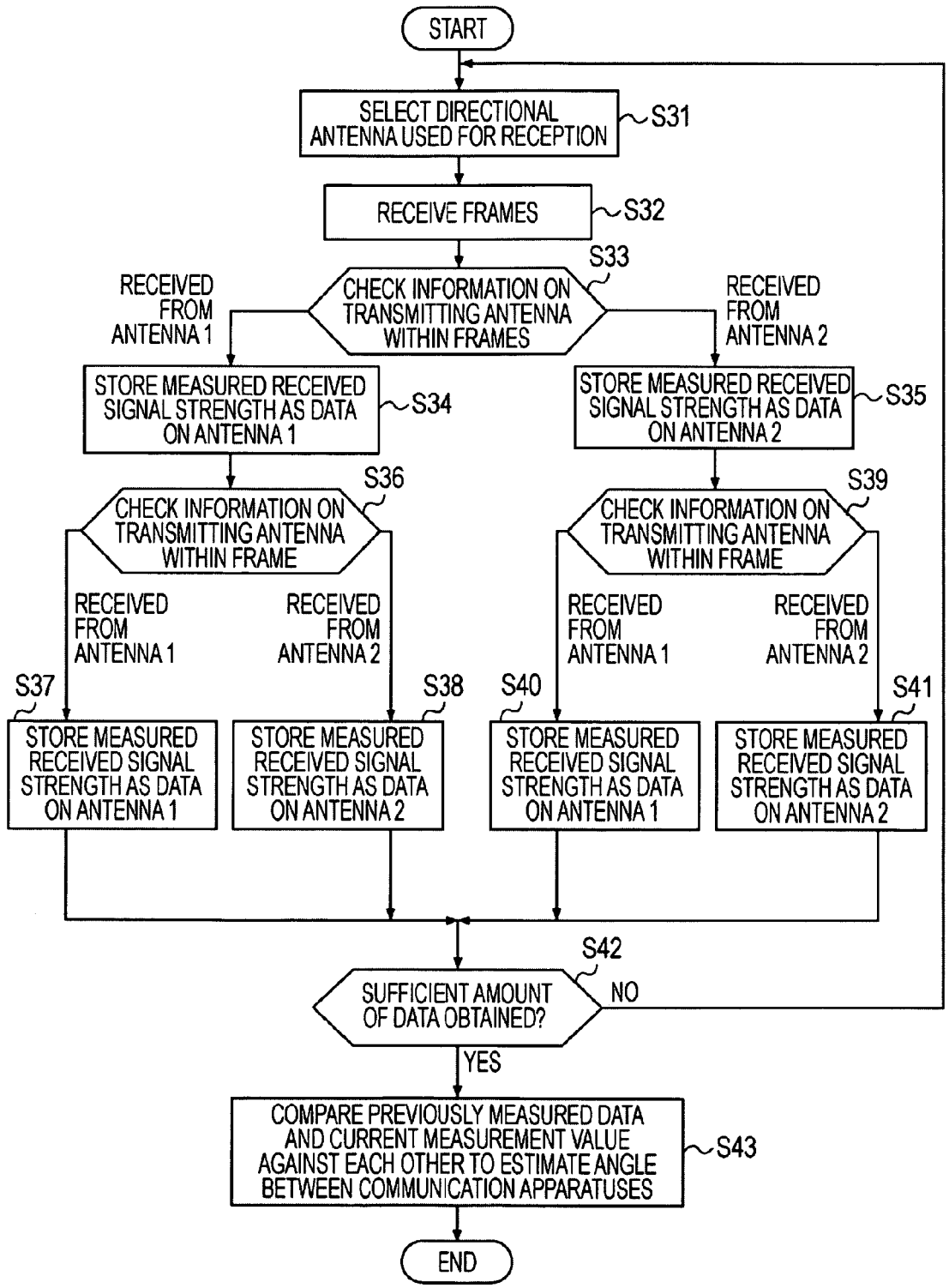
FIG. 14 is a flowchart showing the procedures of processing executed when a receiving device performs arrival angle estimation, in a system in which both a transmitting device and the receiving device use two directional antennas.

FIG. 14 is a flowchart showing the procedures of processing executed when the receiving device 20 performs arrival angle estimation, in a system in which both the transmitting device 10 and the receiving device 20 use two directional antennas.

The transfer control section 6 selects a directional antenna to be used for reception (step S31), and upon arrival of frames from the transmitting device (step S32), checks the receiving antenna (step S33).

When the antenna 1 is selected as the receiving antenna, an RF signal received by the antenna 1 via the antenna switching mechanism 5 is transferred to the RF section 4, followed by a decoding/demodulation process in the signal processing section 3. Further, the received signal strength measured at that time is stored as data on the antenna 1 (step S34).

Next, information embedded in each of the frames is read to check through which one of the antennas on the transmitting device 10 side the frame has been transmitted (step S36). If the received frame has been transmitted from the antenna 1 on the transmitting device 10 side, the measured received signal strength is stored as data on the antenna 1 (step S37), and if the received frame has been transmitted from the antenna 2 on the transmitting device 10 side, the received signal strength is stored as data on the antenna 2 (step S38).

On the other hand, when the antenna 2 is selected as the receiving antenna, an RF signal received by the antenna 2 via the antenna switching mechanism 5 is transferred to the RF section 4, followed by a decoding/demodulation process in the signal processing section 3. Further, the received signal strength measured at that time is stored as data on the antenna 2 (step S35).

Next, information embedded in each of the frames is read to check from which one of the antennas on the transmitting device 10 side the frame has been transmitted (step S39). If the received frame has been transmitted from the antenna 1 on the transmitting device 10 side, the measured received signal strength is stored as data on the antenna 1 (step S40), and if the received frame has been transmitted from the antenna 2 on the transmitting device 10 side, the received signal strength is stored as data on the antenna 2 (step S41).

Then, if a sufficient amount of data has been obtained (Yes in step S42), the difference ΔS between the mean Sig1 of the received signal strengths of frames transmitted from the antenna 1, and the mean Sig2 of the received signal strengths of frames transmitted from the antenna 2 is found, and by referencing previously measured data, the angle between the transmitting device 10 and the receiving device 20 is estimated from the current value of ΔS (step S43).

In the case of the arrival angle estimation system using directional antennas on the receiving device 20 side as well, either one of the transmitting device 10 and the receiving device 20 can take an initiative in transferring frames used for arrival angle estimation.

In the former case, the transmitting device 10 transfers data frames while alternately switching the transmitting antennas, and the signal strengths of the data frames are measured on the receiving device 20 side while alternately switching the receiving antennas. If there is no transmit data to be transferred in the upper layer on the transmitting device 10 side, data frames whose data size is 0 are generated and transmitted. Further, the receiving device 20 switches the directional antennas used for reception alternately at a fixed cycle so that the frames can be received from the two antennas with substantially the same frequency.

In the latter case, the receiving device 20 that estimates the arrival angle transmits data frames by using either one of the directional antennas while switching the transmitting antennas at fixed intervals, and the receiving device 20 receives acknowledgement frames, which are returned from the transmitting device 10 in response to the data frames, while switching the receiving antennas alternately, and measures the signal strengths of the acknowledgement frames. If there is no data to be transferred in the upper layer on the receiving device 20 side, data frames whose data size is 0 are generated and transmitted.

G. Estimation of Tilt of Communication System Using Polarization

It is also possible to detect the tilt of a mobile communication apparatus equipped with a directional antenna through application of the above-described arrival angle estimation method.

Figure 15:
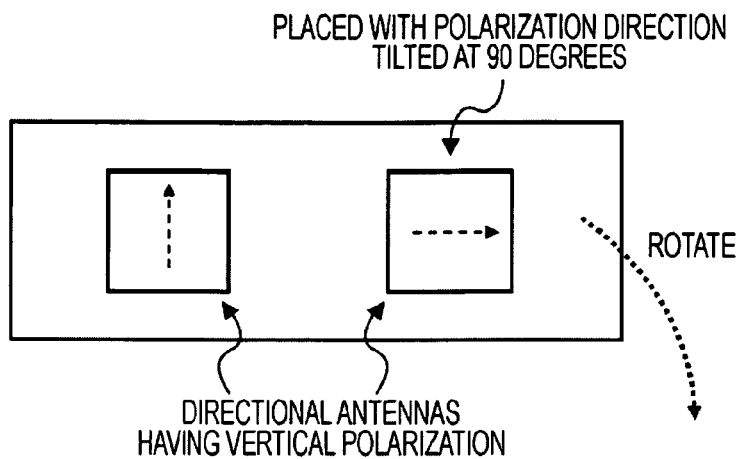
FIG. 15 is a diagram showing a state in which two directional antennas having vertical polarization are installed, one vertically and the other at a tilt of 90 degrees.
Figure 16:
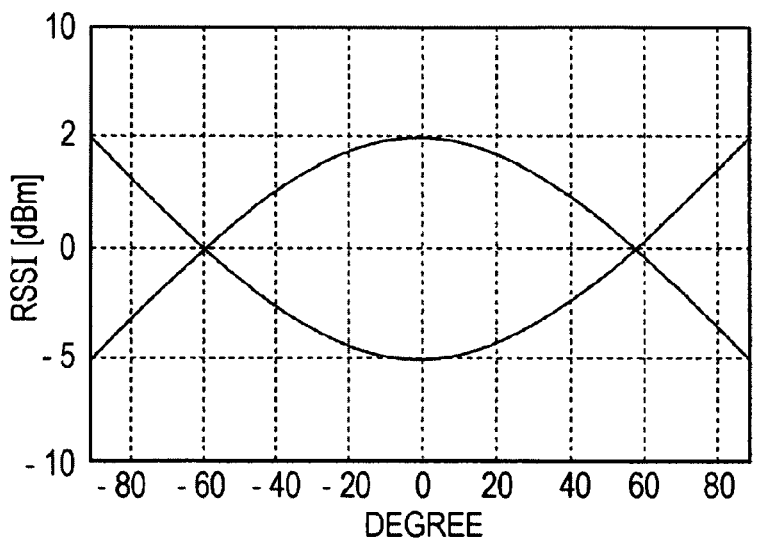
FIG. 16 is a diagram showing variations in the signal strengths of frames received on the receiving side, when the frames are transmitted while switching the antennas alternately and rotating the surface on which the directional antennas shown in FIG. 15 are mounted.

For example, as shown in FIG. 15, two directional antennas having vertical polarization are installed, one vertically and the other at a tilt of 90 degrees, on the same surface of the transmitting device 10. At this time, with the surface on which the two antennas are mounted being rotated as indicated by the arrow in the drawing, frames are transmitted while alternately switching the antennas at fixed intervals. FIG. 16 shows variations in the signal strengths of frames received on the receiving device 20 side. In the drawing, the X axis represents the angle of tilt with respect to the horizontal direction of the transmitting device 10, and the Y axis represents the signal strength of a received frame.

Figure 17:
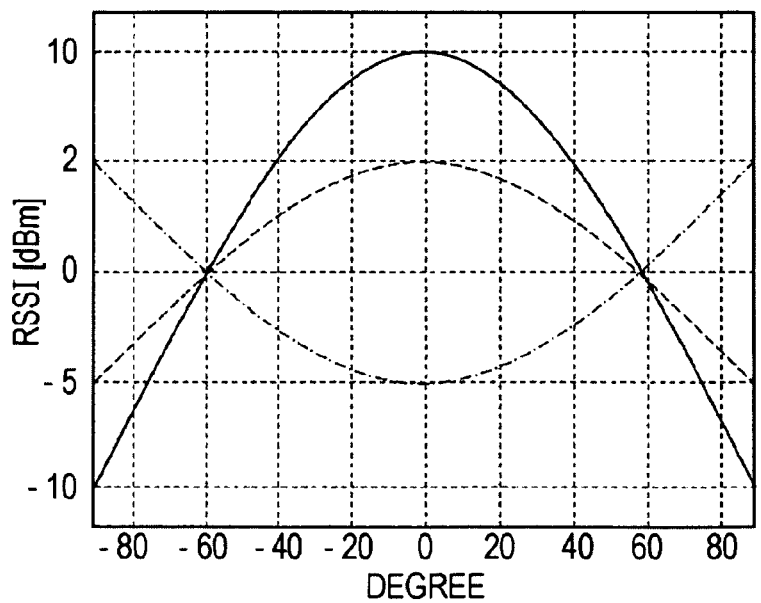
FIG. 17 is a diagram showing the mean values of signal strengths when frames are received by a receiving device from respective directional antennas of a transmitting device including two directional antennas each having vertical polarization and arranged so that their polarization directions are orthogonal to each other, and the relationship between the difference between the two mean values of signal strengths and the tilt of the transmitting device.

In the same manner as described above, the receiving device 20 reads information embedded in each received signal to sequentially determine from which one of the antennas the frame has been transmitted. Then, the mean of the received signal strengths of frames is found for each transmitting antenna. At this time, if the mean of the signal strengths of frames transmitted from the antenna 1 on the transmitting device 10 side is $Sig_{P1}$, and the mean of the signal strengths of frames transmitted from the antenna 2 is $Sig_{P2}$, the difference ΔP between the two signal strengths can be represented by $\Delta P = Sig_{P1} - Sig_{P2}$. ΔP varies in accordance with the angle of tilt with respect to the horizontal direction of the transmitting device 10 on which the directional antennas are mounted. FIG. 17 shows the relationship between ΔP and the angle of tilt with respect to the horizontal direction of the transmitting device 10. In the drawing, ΔP is indicated by a solid line, and $Sig_{P1}$ indicative of the mean received signal strength of frames transmitted from the antenna 1 and $Sig_{P2}$ indicative of the mean received signal strength of frames transmitted from the antenna 2 are indicated by a broken line and an alternate long and short dash line, respectively.

The angle with respect to the horizontal direction of the transmitting device 10 can be estimated by using this value of ΔP. That is, frames are transmitted while varying the angle with respect to the horizontal direction of the transmitting device 10, and the signal strengths of received frames are measured on the receiving device 20 side. At the same time, the relationship between the difference ΔP in received signal strength between transmitting antennas and the angle with respect to the horizontal direction of the transmitting device 10 is found and recorded in advance.

When the transmitting device 10 communicates with the receiving device 20 while alternately switching transmitting antennas, the receiving device 20 receives frames from the respective transmitting antennas of the transmitting device 10 and measures the signal strengths, and also finds the difference ΔP in received signal strength between the transmitting antennas. Then, by referencing previously measured data of the difference ΔP, the angle of tilt of the transmitting device 10 can be estimated from the current value of ΔP.

The problem with detecting a tilt by using polarization is that the value of ΔP varies in accordance with the relative angle between the receiving device 20 and the transmitting device 10. Thus, when detecting a tilt, the tilt detection must be performed after the angle between the transmitting device 10 and the receiving device 20 becomes a predetermined angle (for example, an angle at which they face opposite each other).

Making the angle between the transmitting device 10 and the receiving device 20 be a specific angle can be realized by presenting information such as the standing position, direction, or the like to be assumed when performed tilt detection to the user in advance.

H. Detection of Tilt and Relative Angle of Communication Apparatus by Using Plural Feeding Points The present invention assumes the use of a low-cost and compact microstrip antenna. The advantage of a microstrip antenna is that it can be adapted to various polarizations by merely changing the feeding point.

Figure 18:
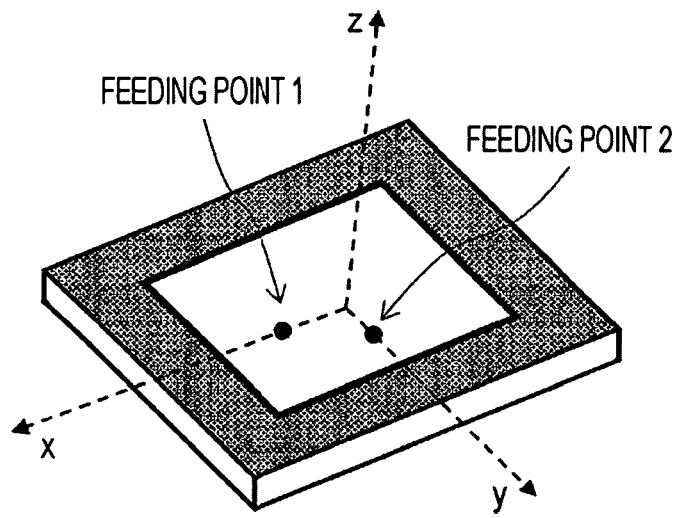
FIG. 18 is a diagram showing the configuration of a microstrip antenna having two feeding points.

For example, a design may be adopted such than when a microstrip antenna having two feeding points 1 and 2 as shown in FIG. 18 is used to feed power from the feeding point 1, vertical polarization is produced when feeding power from the feeding point 1, and horizontal polarization is produced when feeding power from the feeding point 2. When these antennas are installed on the same surface of the transmitting device in the same manner as in FIG. 15, the combination of polarizations of the two directional antennas can be freely changed by switching the feeding points. For example, a combination may be employed such that the polarization directions of two directional antennas having vertical polarization coincide with or are orthogonal to each other.

Figure 19:
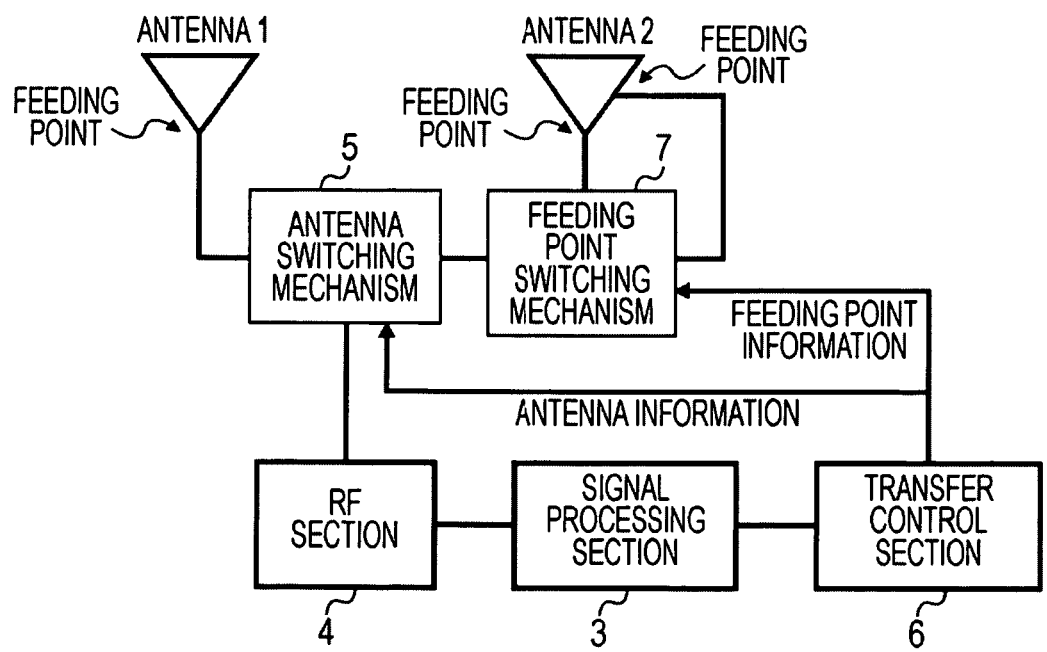
FIG. 19 is a diagram showing the configuration of a transmitting device in which the combination of polarizations of two directional antennas having vertical polarization can be freely changed.

FIG. 19 shows the configuration of the transmitting device 10 in which the combination of polarizations of two directional antennas having vertical polarization can be freely changed.

The signal processing section 3 applies predetermined processing such as baseband processing to transmission data supplied from an upper layer of the communication protocol. The RF section 4 converts a transmitted baseband signal into an analog signal, and upconverts the signal into an RF signal. A feeding point switching mechanism 7 switches the feeding point of each directional antenna in accordance with an instruction from the transfer control section 6. Further, the antenna switching mechanism 5 transmits frames while switching the antennas used for transmission alternately at short fixed intervals, in accordance with an instruction from the transfer control section 6. At that time, information for determining from which antenna each frame has been transmitted is added to each transmitted frame.

Each directional antenna includes two feeding points, and the transfer control section 6 changes the combination of polarizations by the feeding point switching mechanism 7 controlling from which of the feeding points power is to be fed.

Then, the tilt and relative angle of a communication apparatus are measured on the basis of the results of signal processing, and antenna information from the antenna switching mechanism 5 and the feeding point switching mechanism 7. By employing the system configured as described above, two functions, that is, detection of the relative angle between the receiving device 20 and the transmitting device 10, and detection of the tilt of the communication device 10, can be performed by a pair of antennas alone.

I. Examples

In the following, specific applications of the above-described arrival angle estimation system will be described in detail.

I-1. Interaction Between Screen Installed on Wall and Mobile Device

Figure 20:
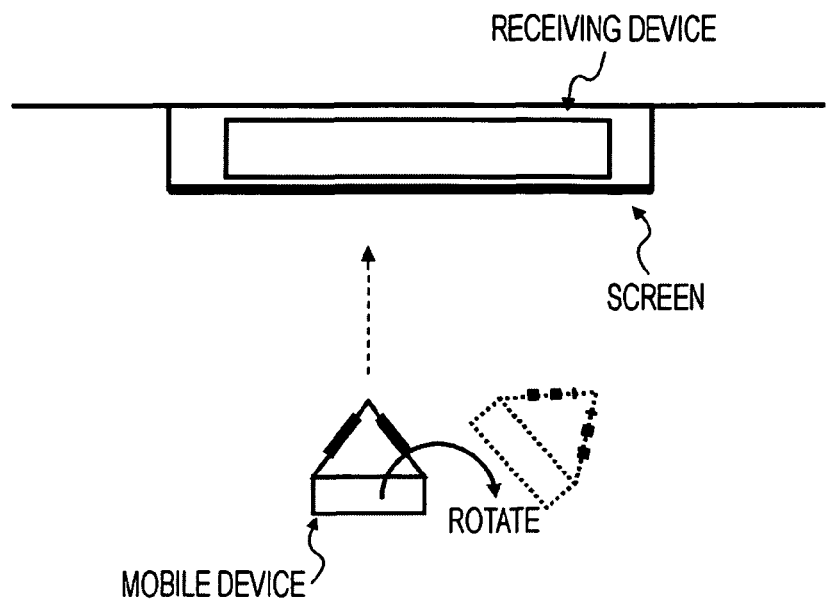
FIG. 20 is a diagram conceptually showing an interaction that takes place in a system including a transmitting device operated by a user and a receiving device installed inside or near a screen installed on the wall.

In this example, a user operates a transmitting device configured as a mobile device with directional antennas mounted thereon. A receiving device is installed inside or near a screen that is installed on the wall, and can measure the relative angle between the mobile device carried by the user and the receiving device. At this time, information to be displayed on the screen is changed in accordance with the angle of the mobile device. FIG. 20 is a conceptual drawing of this arrangement.

As an application of this example, it is also possible to realize a system in which, in situations where there are a plurality of users carrying mobile devices with directional antennas mounted thereon, devices that are facing opposite the receiving device can exchange information via the receiving device installed on the wall. During the exchange of information, processing such as displaying information of the devices facing opposite the receiving device on the screen is performed.

I-2. Measurement of Position of Mobile Device

Figure 21:
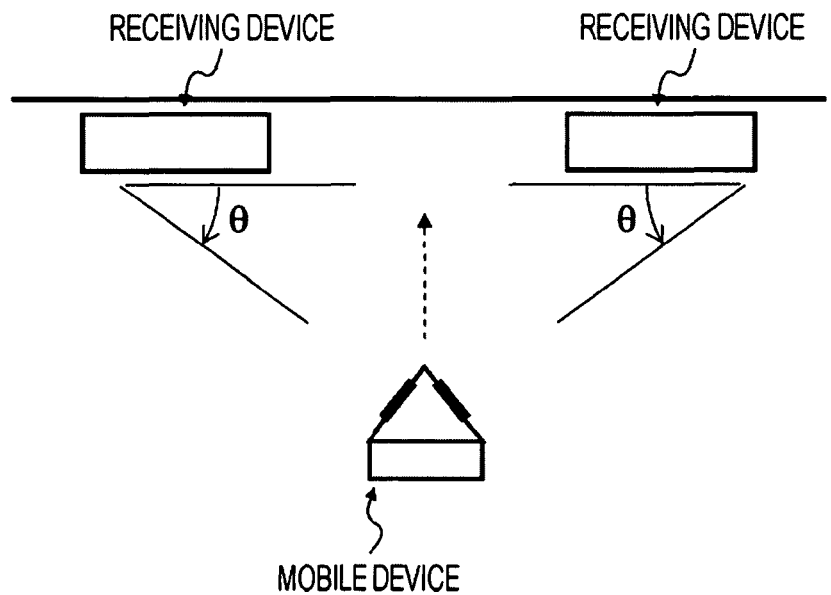
FIG. 21 is a diagram conceptually showing a system in which a user operates a mobile device having directional antennas mounted thereon, a plurality of receiving devices are used to measure the relative angles with respect to the mobile device, and the position of the mobile device is estimated from the measurement results.

In this example, as shown in FIG. 21, a user operates a mobile device with directional antennas mounted thereon. At this time, a plurality of receiving devices are used to measure the relative angles with respect to the mobile device. The position of the mobile device within a space is estimated from the measurement results.

I-3. Interaction Between Mobile Devices

Figure 22:
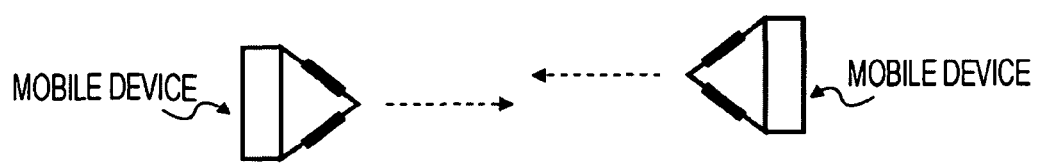
FIG. 22 is a diagram conceptually showing an interaction that takes place when users carrying mobile devices make their mobile device face opposite each other.

In this example, as shown in FIG. 22, each of users operates a mobile device with directional antennas mounted thereon. At this time, each mobile device checks at fixed intervals whether or not another communication apparatus exists at a position facing opposite the mobile device. Then, when the users carrying the mobile devices make their mobile devices face opposite each other, a data transfer process is started, and the arrival angle is estimated in at least one of the mobile devices.

I-4. Detection of Tilt of Mobile Device

In this example, the tilt of a mobile device is detected by using the technique described in the item G above. A user operates a mobile device with one of its two directional antennas mounted at a tilt of 90 degrees. A receiving device is mounted inside or near a screen installed on the wall, and can measure the tilt angle with respect to the horizontal direction of the mobile device carried by the user (see FIG. 20 for reference). The user carrying the mobile device stands still at a position facing opposite the screen as the initial position, and changes the tilt of the mobile device in an arbitrary manner. On the receiving device side, information to be displayed on the screen is changed in accordance with the tilt of the mobile device.

The present invention has been described above in detail by way of its specific embodiments. However, it will be obvious that a person skilled in the art can anticipate various modifications and alternatives to the above-mentioned embodiments without departing from the scope of the present invention.

While in this specification the description is mainly focused on embodiments of the present invention as applied to the radio technology that complies with IEEE802.11, the scope of the present invention is not necessarily limited to this. The present invention can be similarly applied to various radio communication systems in which an accuracy of about ±30 degrees suffices as the accuracy of arrival angle estimation.

That is, the foregoing disclosure of the present invention has been made only by way of examples and should not be construed restrictively. The scope of the present invention should be determined by reference to the appended claims.

What is claimed is:

1. An arrival angle estimation system comprising a transmitting device and a receiving device, the arrival angle estimation system estimating an arrival angle at which frames transmitted by radio from the transmitting device arrive at the receiving device, wherein:
the transmitting device includes two first directional antennas being arranged so that corresponding directivities are tilted at ±θ degrees with respect to a front portion of the transmitting device, the transmitting device being configured to:
select alternating ones of the first directional antennas to transmit a corresponding one of the frames to the receiving device;
modify a portion of the corresponding frame in response to the selection, the modified portion identifying the selected first directional antenna; and
transmit the corresponding frame from the first selected directional antenna to the receiving device; and
the receiving device includes a second directional antenna having directivity toward a front portion of the receiving device, the receiving device being configured to:
receive the corresponding frame from the transmitting device at a corresponding signal strength;
identify the selected first directional antenna of the transmitting device, based on the modified portion of the corresponding frame;
obtain (i) signal strength data for the first directional antennas and (ii) information identifying a correlation between differences in signal strength and arrival angles, the signal strength data comprising values of signal strength of previous transmissions received from at least one of the selected first directional antenna or the unselected first directional antenna;
compute, based on the corresponding signal strength and the obtained signal strength data, a difference between a first mean signal strength of transmissions received from the selected first directional antenna and a second mean signal strength of transmissions received from the unselected first directional antenna; and
estimate the arrival angle based on at least the computed difference and the obtained correlation information.

2. The arrival angle estimation system of claim 1, wherein:
the transmitting device transmits frames to the receiving device by alternately switching the first directional antennas while varying arrival angles between the transmitting device and the receiving device;
the receiving device measures received signal strengths of the frames received from the respective first directional antennas to obtain differences in received signal strength between the first directional antennas; and
the receiving device determines the correlation between the differences and the arrival angles and stores the correlation information in advance.

3. The arrival angle estimation system of claim 1, wherein:
by assuming that the transmitting device transmits frames from the first directional antennas at a common transmission power, and that a propagation loss between the first directional antennas and the second directional antenna is the same, a difference in gain between the transmitting directional antennas is regarded as the difference in the mean signal strengths.

4. The arrival angle estimation system of claim 2, wherein:
the transmitting device transfers the frames while alternately switching the first directional antennas used for transmission at a fixed cycle, and the receiving device measures signal strengths of the transferred data frames.

5. The arrival angle estimation system of claim 4, wherein:
if there is no transmit data to be transferred in an upper layer, the transmitting device generates and transmits frames whose data size is 0.

6. The arrival angle estimation system of claim 1, wherein:
the correlation information identifies (i) a plurality of differences in mean signal strength of the selected and unselected first directional antennas and (ii) arrival angles associated with corresponding ones of the differences;
the receiving device is further configured to:
identify a difference in mean signal strength within the correlation information that matches the computed difference; and
establish the estimated arrival angle as the arrival angle within the correlation information that corresponds to the identified difference.

7. The arrival angle estimation system of claim 1, wherein:
the corresponding frame comprises a Subtype field, the Subtype field being associated with defined values and undefined values;
the transmitting device is further configured to:
assign the information identifying the selected first directional antenna to one of the undefined values; and
modify the Subtype field of the corresponding frame to include the assigned undefined value.

* * * * *